United States Patent
Abotabl et al.

(10) Patent No.: US 12,256,330 B2
(45) Date of Patent: Mar. 18, 2025

(54) WAKE-UP SIGNAL TRAFFIC INDICATION TECHNIQUES FOR WIRELESS COMMUNICATIONS

(71) Applicant: QUALCOMM Incorporated, San Diego, CA (US)

(72) Inventors: Ahmed Attia Abotabl, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 17/898,281

(22) Filed: Aug. 29, 2022

(65) Prior Publication Data

US 2024/0073819 A1    Feb. 29, 2024

(51) Int. Cl.
*H04W 52/02* (2009.01)
*H04W 74/00* (2009.01)

(52) U.S. Cl.
CPC ..... *H04W 52/0229* (2013.01); *H04W 74/004* (2013.01)

(58) Field of Classification Search
CPC . H04W 8/005; H04W 24/08; H04W 74/0808; H04W 52/0229; H04W 68/02; H04W 72/23; H04W 48/12; H04W 48/16; H04W 68/005; H04W 52/0245; H04W 74/0833; H04W 52/0216; H04L 5/0051; H04L 5/0055; H04L 5/0053; H04L 5/005; Y02D 30/70; H04B 7/0617
See application file for complete search history.

(56) References Cited

U.S. PATENT DOCUMENTS 9,565,713 B2 *   2/2017   Maeda ................. H04W 24/02
9,781,639 B2 * 10/2017   Nory ................. H04W 36/0061
(Continued)

OTHER PUBLICATIONS

Intel Corporation: "Considerations on PDCCH-Based Power Saving Signal", 3GPP TSG-RAN WG1 #99, R1-1912225, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, pp. 1-10, XP051823302, the Whole Document.
(Continued)

*Primary Examiner* — Jung Liu
(74) *Attorney, Agent, or Firm* — Dalei Dong; Holland & Hart LLP

(57) ABSTRACT

Methods, systems, and devices for wireless communications are described in which a network entity may use a lower power sleep procedure to reduce power consumption, and monitor for a wake-up signal (WUS) from at least one user equipment (UE) during configured WUS occasions. The WUS from one or more UEs may provide information of one or more attributes of data traffic that is present at a transmit buffer of the one or more UEs. A WUS configuration may be provided from a network entity that allows the selection of a particular WUS to indicate one or more attributes of the data traffic at the UE. The WUS may convey information such as buffer status, power headroom, a priority of traffic, latency targets of the traffic, or any combinations thereof. The WUS may also give an indication of a requested duration of an active mode at the network entity.

30 Claims, 19 Drawing Sheets

(56) References Cited

U.S. PATENT DOCUMENTS

| | | | |
|---|---|---|---|
| 9,832,713 B2 * | 11/2017 | Nory | H04W 52/0216 |
| 10,285,138 B2 * | 5/2019 | Hunukumbure | H04W 48/10 |
| 11,012,975 B2 * | 5/2021 | Sharma | H04W 52/0235 |
| 11,234,190 B2 * | 1/2022 | Wong | H04W 52/0216 |
| 11,290,981 B2 * | 3/2022 | Berggren | H04W 68/005 |
| 11,382,037 B2 * | 7/2022 | Sharma | H04W 76/28 |
| 11,405,897 B2 * | 8/2022 | Maeda | H04W 76/27 |
| 11,457,436 B2 * | 9/2022 | Wong | H04W 52/0235 |
| 11,653,301 B2 * | 5/2023 | Kuo | H04L 5/0055 370/329 |
| 11,696,293 B2 * | 7/2023 | Maeda | H04W 52/0206 455/418 |
| 2016/0192432 A1 * | 6/2016 | Maeda | H04W 24/02 455/418 |
| 2017/0150428 A1 * | 5/2017 | Nory | H04W 52/0216 |
| 2020/0053637 A1 * | 2/2020 | Tsai | H04W 48/16 |
| 2020/0053646 A1 * | 2/2020 | Kuo | H04W 8/005 |
| 2020/0100179 A1 | 3/2020 | Zhou et al. | |
| 2020/0351784 A1 * | 11/2020 | Tsai | H04W 72/23 |
| 2020/0367168 A1 * | 11/2020 | Hwang | H04W 52/0229 |
| 2021/0227466 A1 * | 7/2021 | Kim | H04W 68/025 |
| 2021/0377852 A1 | 12/2021 | Zhou et al. | |
| 2022/0210866 A1 | 6/2022 | He et al. | |
| 2022/0217636 A1 * | 7/2022 | Shrivastava | H04L 5/0055 |
| 2022/0303897 A1 * | 9/2022 | Xu | H04W 76/28 |
| 2022/0346014 A1 * | 10/2022 | Fei | H04W 68/005 |
| 2022/0361166 A1 * | 11/2022 | Maeda | H04W 76/27 |
| 2023/0063026 A1 * | 3/2023 | Reial | H04W 52/0235 |
| 2023/0232310 A1 * | 7/2023 | Su | H04W 4/70 455/422.1 |

OTHER PUBLICATIONS

International Search Report and Written Opinion—PCT/US2023/029081—ISA/EPO—Dec. 6, 2023.

* cited by examiner

WAKE-UP SIGNAL TRAFFIC INDICATION TECHNIQUES FOR WIRELESS COMMUNICATIONS

FIELD OF TECHNOLOGY

The following relates to wireless communications, including wake-up signal traffic indication techniques for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support wake-up signal traffic indication techniques for wireless communications. For example, the described techniques provide that a network entity may use a lower power sleep procedure to reduce power consumption, and monitor for a wake-up signal (WUS) from at least one user equipment (UE) during configured WUS occasions. The WUS from one or more UEs may provide information in addition to a binary indication of whether the UE has traffic in a transmit buffer. In some cases, a WUS configuration may be provided to the UE that allows the selection of a particular WUS to indicate one or more attributes of traffic at the UE. In some implementations, a WUS may provide an indication that a cell served by a network entity is to wake-up, and also convey information such as buffer status, power headroom, a priority of traffic, latency targets of the traffic, or any combinations thereof. In some cases, the UE may also give a recommendation on how long the network should stay awake. The network entity may use such information to set one or more parameters for an associated active period.

A method for wireless communication at a user equipment (UE) is described. The method may include receiving configuration information for a wake-up signal transmission, the configuration information indicates a set of wake-up signals, each wake-up signal of the set of wake-up signals indicating one or more different attributes of traffic that is to be transmitted from the UE, selecting a first wake-up signal from the set of wake-up signals based on a first attribute of first traffic that is to be transmitted from the UE, and transmitting the first wake-up signal during a wake-up signal occasion to indicate to a cell that the cell is requested to be in an active state for a time period outside of the wake-up signal occasion based on the first attribute indication of the first wake-up signal.

An apparatus for wireless communication at a UE is described. The apparatus may include a processor, memory coupled with the processor, and instructions stored in the memory. The instructions may be executable by the processor to cause the apparatus to receive configuration information for a wake-up signal transmission, the configuration information indicates a set of wake-up signals, each wake-up signal of the set of wake-up signals indicating one or more different attributes of traffic that is to be transmitted from the UE, select a first wake-up signal from the set of wake-up signals based on a first attribute of first traffic that is to be transmitted from the UE, and transmit the first wake-up signal during a wake-up signal occasion to indicate to a cell that the cell is requested to be in an active state for a time period outside of the wake-up signal occasion based on the first attribute indication of the first wake-up signal.

Another apparatus for wireless communication at a UE is described. The apparatus may include means for receiving configuration information for a wake-up signal transmission, the configuration information indicates a set of wake-up signals, each wake-up signal of the set of wake-up signals indicating one or more different attributes of traffic that is to be transmitted from the UE, means for selecting a first wake-up signal from the set of wake-up signals based on a first attribute of first traffic that is to be transmitted from the UE, and means for transmitting the first wake-up signal during a wake-up signal occasion to indicate to a cell that the cell is requested to be in an active state for a time period outside of the wake-up signal occasion based on the first attribute indication of the first wake-up signal.

A non-transitory computer-readable medium storing code for wireless communication at a UE is described. The code may include instructions executable by a processor to receive configuration information for a wake-up signal transmission, the configuration information indicates a set of wake-up signals, each wake-up signal of the set of wake-up signals indicating one or more different attributes of traffic that is to be transmitted from the UE, select a first wake-up signal from the set of wake-up signals based on a first attribute of first traffic that is to be transmitted from the UE, and transmit the first wake-up signal during a wake-up signal occasion to indicate to a cell that the cell is requested to be in an active state for a time period outside of the wake-up signal occasion based on the first attribute indication of the first wake-up signal.

In some examples of the method, apparatuses, and non-transitory computer-readable medium described herein, the first wake-up signal may be a random access request transmitted via a random access channel (RACH), or may be request that is transmitted via a control channel. In some examples of the method, apparatuses, and non-transitory computer-readable medium described herein, the selecting the first wake-up signal may include operations, features, means, or instructions for selecting the first wake-up signal from the set of wake-up signals based on a transmit buffer status of the UE, a power headroom available at the UE, a priority of the first traffic, a latency target of the first traffic, or any combinations thereof. In some examples of the method, apparatuses, and non-transitory computer-readable medium described herein, the selecting the first wake-up signal may include operations, features, means, or instructions for selecting the first wake-up signal from the set of wake-up signals based on a time duration that the cell is requested to be in the active state.

In some examples of the method, apparatuses, and non-transitory computer-readable medium described herein, the set of wake-up signals includes a set of random access preambles, and one or more of the random access preambles may be mapped to the one or more different attributes of traffic that is to be transmitted from the UE. In some examples of the method, apparatuses, and non-transitory computer-readable medium described herein, the set of random access preambles includes two or more different subsets of random access preambles, and where each of the two or more different subsets of random access preambles may be mapped to the one or more different attributes of traffic that is to be transmitted from the UE.

In some examples of the method, apparatuses, and non-transitory computer-readable medium described herein, the configuration information may be received via radio resource control (RRC) signaling. In some examples of the method, apparatuses, and non-transitory computer-readable medium described herein, the RRC signaling maps each subset of the two or more different subsets of random access preambles to a different combination of two or more attributes of traffic that is to be transmitted from the UE.

In some examples of the method, apparatuses, and non-transitory computer-readable medium described herein, the transmitting the first wake-up signal may include operations, features, means, or instructions for transmitting an uplink control channel transmission that includes a payload that indicates the one or more different attributes of traffic that is to be transmitted from the UE. In some examples of the method, apparatuses, and non-transitory computer-readable medium described herein, the payload includes an index value of a set of index values, where each index value of the set of index values is mapped to a different combination of two or more attributes of traffic that is to be transmitted from the UE.

Some examples of the method, apparatuses, and non-transitory computer-readable medium described herein may further include operations, features, means, or instructions for monitoring for a response communication from the cell based on the first attribute indication of the first wake-up signal. In some examples of the method, apparatuses, and non-transitory computer-readable medium described herein, the monitoring may include operations, features, means, or instructions for monitoring for a downlink control channel communication in a time window that is based on a latency associated with the first attribute indication of the first wake-up signal.

A method for wireless communication at a network entity is described. The method may include transmitting configuration information to a UE for a wake-up signal transmission, the configuration information indicates a set of wake-up signals, each wake-up signal of the set of wake-up signals indicating one or more different attributes of traffic that is to be transmitted from the UE, receiving a first wake-up signal from the UE during a wake-up signal monitoring occasion, and determining one or more parameters associated with a transition to an active state for communications with the UE based on a first attribute of first traffic that is to be transmitted from the UE, the first attribute indicated by the first wake-up signal.

An apparatus for wireless communication at a network entity is described. The apparatus may include a processor, memory coupled with the processor, and instructions stored in the memory. The instructions may be executable by the processor to cause the apparatus to transmit configuration information to a UE for a wake-up signal transmission, the configuration information indicates a set of wake-up signals, each wake-up signal of the set of wake-up signals indicating one or more different attributes of traffic that is to be transmitted from the UE, receive a first wake-up signal from the UE during a wake-up signal monitoring occasion, and determine one or more parameters associated with a transition to an active state for communications with the UE based on a first attribute of first traffic that is to be transmitted from the UE, the first attribute indicated by the first wake-up signal.

Another apparatus for wireless communication at a network entity is described. The apparatus may include means for transmitting configuration information to a UE for a wake-up signal transmission, the configuration information indicates a set of wake-up signals, each wake-up signal of the set of wake-up signals indicating one or more different attributes of traffic that is to be transmitted from the UE, means for receiving a first wake-up signal from the UE during a wake-up signal monitoring occasion, and means for determining one or more parameters associated with a transition to an active state for communications with the UE based on a first attribute of first traffic that is to be transmitted from the UE, the first attribute indicated by the first wake-up signal.

A non-transitory computer-readable medium storing code for wireless communication at a network entity is described. The code may include instructions executable by a processor to transmit configuration information to a UE for a wake-up signal transmission, the configuration information indicates a set of wake-up signals, each wake-up signal of the set of wake-up signals indicating one or more different attributes of traffic that is to be transmitted from the UE, receive a first wake-up signal from the UE during a wake-up signal monitoring occasion, and determine one or more parameters associated with a transition to an active state for communications with the UE based on a first attribute of first traffic that is to be transmitted from the UE, the first attribute indicated by the first wake-up signal.

In some examples of the method, apparatuses, and non-transitory computer-readable medium described herein, the first wake-up signal may be a random access request transmitted via a RACH, or may be request that is transmitted via a control channel. In some examples of the method, apparatuses, and non-transitory computer-readable medium described herein, the one or more different attributes of traffic that is to be transmitted from the UE include one or more of a transmit buffer status of the UE, a power headroom available at the UE, a priority of the first traffic, a latency target of the first traffic, or any combinations thereof. In some examples of the method, apparatuses, and non-transitory computer-readable medium described herein, the first wake-up signal further indicates a time duration requested for the active state for communications with the UE.

In some examples of the method, apparatuses, and non-transitory computer-readable medium described herein, the set of wake-up signals includes a set of random access preambles, and one or more of the random access preambles are mapped to the one or more different attributes of traffic that is to be transmitted from the UE. In some examples of the method, apparatuses, and non-transitory computer-readable medium described herein, the set of random access preambles includes two or more different subsets of random access preambles, and where each of the two or more different subsets of random access preambles are mapped to the one or more different attributes of traffic that is to be transmitted from the UE.

In some examples of the method, apparatuses, and non-transitory computer-readable medium described herein, the configuration information may be transmitted via RRC signaling. In some examples of the method, apparatuses, and non-transitory computer-readable medium described herein, the RRC signaling maps each subset of the two or more different subsets of random access preambles to a different combination of two or more attributes of traffic that is to be transmitted from the UE.

In some examples of the method, apparatuses, and non-transitory computer-readable medium described herein, the receiving the first wake-up signal may include operations, features, means, or instructions for receiving an uplink control channel transmission that includes a payload that indicates the one or more different attributes of traffic that is to be transmitted from the UE. In some examples of the method, apparatuses, and non-transitory computer-readable medium described herein, the payload includes an index value of a set of index values, where each index value of the set of index values is mapped to a different combination of two or more attributes of traffic that is to be transmitted from the UE.

Some examples of the method, apparatuses, and non-transitory computer-readable medium described herein may further include operations, features, means, or instructions for transmitting a response communication to the UE based on the first attribute indicated by the first wake-up signal. In some examples of the method, apparatuses, and non-transitory computer-readable medium described herein, a timing for transmission of the response communication may be based on a latency associated with the first attribute indicated by the first wake-up signal.

DETAILED DESCRIPTION

Figure 1:
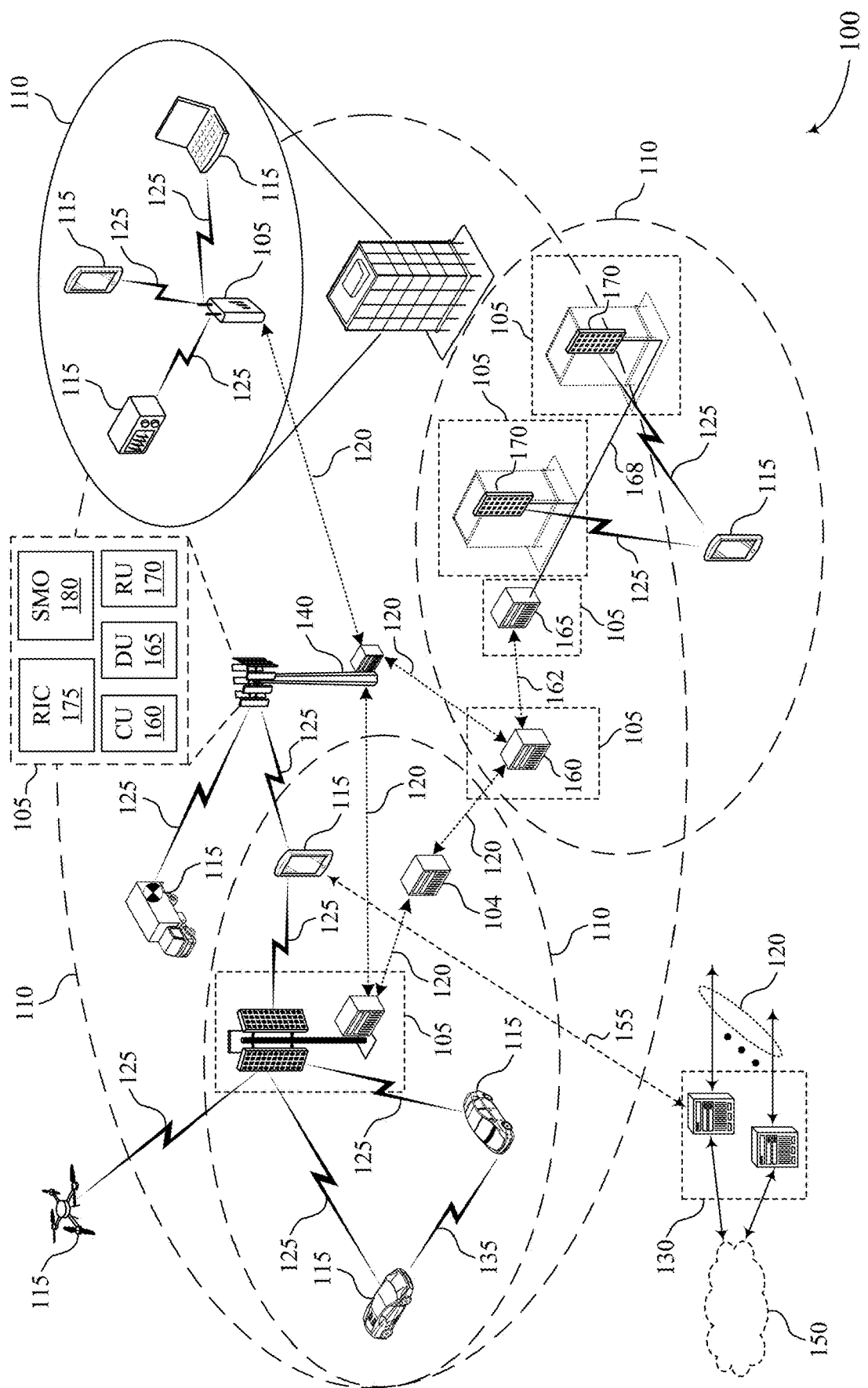
FIG. 1 illustrates an example of a wireless communications system that supports wake-up signal traffic indication techniques for wireless communications in accordance with one or more aspects of the present disclosure.

A wireless communications system may include a device, such as a user equipment (UE) or a network entity (e.g., an eNodeB (eNB), a next-generation NodeB or a giga-NodeB, either of which may be referred to as a gNB, or some other base station or network entity), that supports wireless communications using one or multiple radio access technologies. Examples of radio access technologies include 4G systems, such as LTE systems, 5G systems, which may be referred to as NR systems, or other systems and radio technologies, including future systems and radio technologies not explicitly mentioned herein (e.g., sixth generation (6G) systems and beyond).

In some wireless communications systems, such as fifth generation (5G) systems, a relatively large amount of power may be consumed by network components in some situations. For example, a network entity in a system that uses beamformed communications, such as a radio unit (RU) or a radio head, may transmit multiple directional beams in multiple directions. Such systems may provide information for use by a UE to access the wireless communications system (e.g., system information that provides parameters for system access) using beam sweeping techniques in which information is provided in multiple different transmissions in multiple different directions. For example, multiple instances of synchronization signal blocks (SSBs) and system information (SI) transmissions (e.g., remaining minimum system information (RMSI) transmissions) may be transmitted across multiple beams in multiple different directions according to a beam sweeping procedure. Such beam sweeping techniques may consume additional power relative to techniques that do not use beam sweeping (e.g., information provided in a single omni-directional transmission may consume less power than transmission of multiple instances of the information in multiple different directions). Further, such beam sweeping transmissions may be transmitted on multiple different cells, such as a primary cell (PCell) and one or more secondary cells (SCells).

In some cases, in order to reduce network power consumption, a network entity may transition to a sleep mode or idle mode in which transmit and receive circuitry is powered down. For example, during off-peak times, there may be no traffic or a light traffic load in a cell, and the network entity may stop or reduce periodic transmissions (e.g., SSB and SI transmissions) and periodic monitoring (e.g., monitoring for random access requests or small data transmission (SDT) communications), and transition to the sleep mode in which periodic active periods are used to monitor for a wake-up signal (WUS) from a served device such as a UE. If the network entity does not detect a WUS, it transitions back to the sleep mode. If one or more WUS is detected, the network entity may maintain an active mode or initiate an active mode in addition to periods during which WUSs are monitored. In some cases, such sleep mode operations may be implemented on one or more SCells, which commonly have less control communications than a PCell and thus are more likely to have periods with light or no traffic, although such techniques may also be used in PCells in some conditions. In some cases, a UE may be configured with a periodicity at which WUSs may be transmitted in accordance with periods during which a cell will monitor for WUSs, which may be referred to as WUS occasions. If data traffic is present in the UE transmit buffer, the UE may transmit a WUS during a WUS occasion to trigger the cell to start or maintain an active state to allow for communications of the UE's data traffic.

In accordance with various aspects discussed herein, techniques are provided in which a WUS may provide additional information in addition to just a binary indication of whether the UE has traffic in a transmit buffer. In some cases, a WUS configuration may be provided to a UE that allows the selection of a particular WUS to indicate one or more attributes of traffic that is present at the UE. A network entity that receives the WUS may use the indication to adjust a wake-up timing, a duration of an associated active period, or any combinations thereof. In some implementations, a WUS may provide an indication that the cell is to wake-up, and also convey information such as buffer status, power headroom, a priority of traffic, latency targets of the traffic, or any combinations thereof. In some cases, the UE may also give a recommendation on how long the network should stay awake. In some cases, the WUS may be a random access preamble, the UE can select a preamble from two or more groups of preambles where each group represents a set of information to be conveyed to the network. The groups and associated traffic attributes may be configured or otherwise signaled to the UE (e.g., via radio resource control (RRC) signaling, via system information associated with the cell, preconfigured in a communications specification, or any combinations thereof). In some cases, a WUS may be transmitted via a control channel (e.g., a physical uplink control channel (PUCCH) transmission with scheduling request (SR)) transmission that may include a payload that conveys information regarding the data to be transmitted by the UE, or traffic attributes. In some cases, a UE may be configured to monitor for different network responses based on the transmitted WUS. For example, if the UE indicates a high priority or low latency requirement in the WUS, the UE may expect a scheduling information transmission (e.g., in downlink control information (DCI) transmitted via a physical downlink control channel (PDCCH)) in an earlier response window than if a lower priority or higher latency is indicated.

Various techniques as discussed herein may provide one or more UE and network enhancements and efficiencies. For example, a network entity may transition to a sleep mode and network power savings may be achieved, and may determine one or more aspects of an active period based on information from a received WUS. Such a network entity may adjust one or more parameters of an active period based on the information conveyed by the WUS, such as a duration of the active period, scheduling priorities for one or more UEs that transmitted WUSs, or a number of transmit or receive chains or antenna ports to activate, to name just a few examples. Further, the information conveyed by the WUS may allow for enhanced scheduling decisions at such a network entity, where priorities of multiple different devices may be used to schedule communications and allocate wireless resources, thus enhancing system efficiency and providing an enhanced user experience.

Aspects of the disclosure are initially described in the context of wireless communications systems. Aspects of the disclosure are further illustrated by and described with reference to WUS timings, process flows, apparatus diagrams, system diagrams, and flowcharts that relate to wake-up signal traffic indication techniques for wireless communications.

FIG. 1 illustrates an example of a wireless communications system 100 that supports wake-up signal traffic indication techniques for wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support wake-up signal traffic indication techniques for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, in order to reduce network power consumption, a network entity 105 may transition to a sleep mode or idle mode in which transmit and receive circuitry is powered down. Such network entities 105 may use periodic active periods to monitor for a WUS from a served device such as a UE 115. If the network entity 105 does not detect a WUS, it may transition back to the sleep mode. If one or more WUS is detected the network entity 105 may maintain an active mode, or initiate an active mode in addition to periods during which WUSs are monitored. In some cases, such sleep mode operations may be implemented on one or more cells that are served by the network entity 105. In some cases, a UE 115 may be configured with a periodicity at which WUSs may be transmitted in accordance with periods during which a cell will monitor for WUSs, which may be referred to as WUS occasions. If data traffic is present in the UE 115 transmit buffer, the UE 115 may transmit a WUS during a WUS occasion to trigger the cell to start or maintain an active state to allow for communications of the UE 115 data traffic.

In accordance with various aspects discussed herein, techniques are provided in which a WUS may provide information in addition to a binary indication of whether the UE 115 has traffic in a transmit buffer. In some cases, a WUS configuration may be provided to a UE 115 that allows the selection of a particular WUS to indicate one or more attributes of traffic that is present at the UE 115. A network entity 105 that receives the WUS may use the indication to adjust a wake-up timing, a duration of an associated active period, or any combinations thereof. In some implementations, a WUS may provide an indication that a cell served by a network entity 105 is to wake-up, and also convey information such as buffer status, power headroom, a priority of traffic, latency targets of the traffic, or any combinations thereof. In some cases, the UE 115 may also give a recommendation on how long the network should stay awake. The network entity 105 may use such information to set one or more parameters for an active period.

Figure 2:
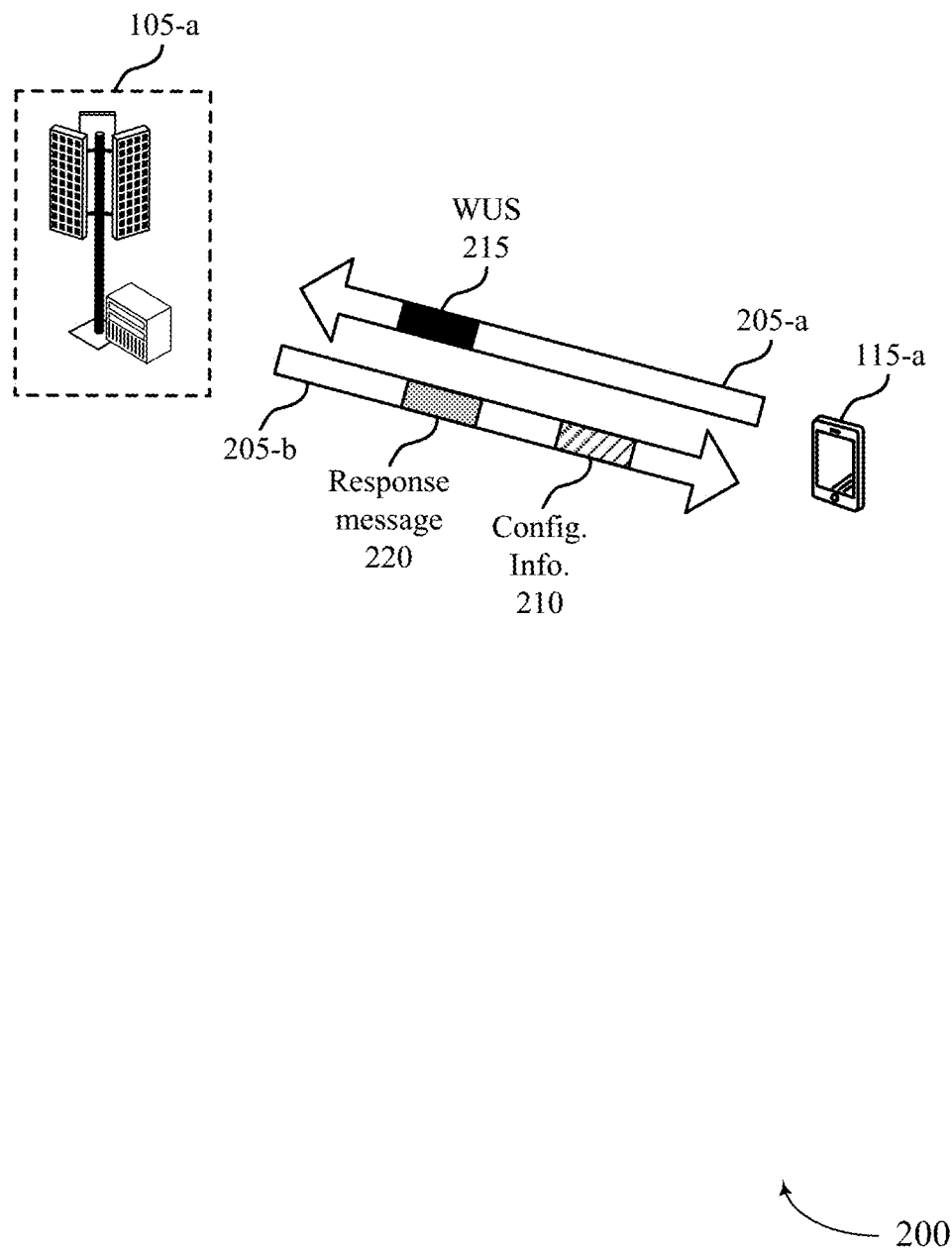
FIG. 2 illustrates an example of a wireless communications system that supports wake-up signal traffic indication techniques for wireless communications in accordance with one or more aspects of the present disclosure.

FIG. 2 illustrates an example of a wireless communications system 200 that supports wake-up signal traffic indication techniques for wireless communications in accordance with one or more aspects of the present disclosure. The wireless communications system 200 may implement or be implemented by aspects of the wireless communications system 100. For example, the wireless communications system 200 may include a network entity 105-a and a UE 115-a, which may be examples of a network entity 105 (e.g., an RU 170, a DU 165, a CU 160, a base station 140, or some combination thereof) and a UE 115 as described with reference to FIG. 1. The network entity 105-a and the UE 115-a may communicate with one another via an uplink channel 205-a and a downlink channel 205-b, which may be examples or components of a communication link 125 as described with reference to FIG. 1. The UE 115-a and network entity 105-a may support techniques for WUS transmissions that indicate one or more attributes of traffic that is present at the UE 115-a. By providing information related to the traffic that is present at the UE 115-a, the UE 115-a and network entity 105-a may promote resource efficiency and reduced power consumption for the wireless communications system 200.

In the example of FIG. 2, the network entity 105-a may transmit configuration information 210 to the UE 115-a. In some cases, the configuration information 210 may include information related to cell sleep and active mode periods and WUS occasions. The network entity 105-a may initiate a sleep procedure at a cell (e.g., a SCell or PCell that is configured at the UE 115-a) based on the configuration information 210. In the event that the UE 115-a has traffic in a transmit buffer, the UE 115-a may transmit a WUS 215 during a WUS occasion based on the configuration information 210. The network entity 105-a may detect the WUS 215, and transmit a response message 220 to the UE 115-a.

In accordance with various aspects discussed herein, the WUS 215 may provide an indication of one or more attributes of the data traffic in the UE 115-a transmit buffer. In some cases, the configuration information 210 may provide a WUS 215 configuration that allows the WUS to indicate the one or more attributes of the traffic that is present at the UE 115-a. For example, a set of WUSs 215 may include two or more subsets of random access channel (RACH) preambles, where a RACH preamble selection from one of the subsets may indicate the associated one or more attributes of the data traffic. Additionally, or alternatively, the WUS 215 may be transmitted via a PUCCH (e.g., a SR transmitted via PUCCH), and the WUS 215 configuration may provide that a payload that is included with the WUS 215 may indicate the one or more attributes of the data traffic. The network entity 105-a, upon receipt of the WUS 215, may use the indication to adjust a wake-up timing, determine a duration of an associated active period, activate one or more antenna ports and associated components, or any combinations thereof. In some implementations, the WUS 215 may convey information such as buffer status, power headroom, a priority of traffic, latency targets of the traffic, or any combinations thereof. In some cases, the UE 115-a may also give a recommendation on how long the network should stay awake. In some cases, the configuration information 210 may be signaled to the UE 115-a via RRC signaling, via system information associated with the cell (e.g., via a master information block (MIB), one or more system information block (SIB), or any combinations thereof), may be preconfigured in a communications specification, or any combinations thereof. In some cases, the UE 115-a may be configured to monitor for the response message 220 (e.g., DCI that indicates scheduling information and a resource allocation, a RACH response, etc.) based on the transmitted WUS 215. For example, if the UE 115-a indicates a high priority or low latency requirement in the WUS 215, the UE 115-a may expect a scheduling information transmission (e.g., in DCI transmitted via a PDCCH) in an earlier response window than if a lower priority or higher latency is indicated.

Figure 3:
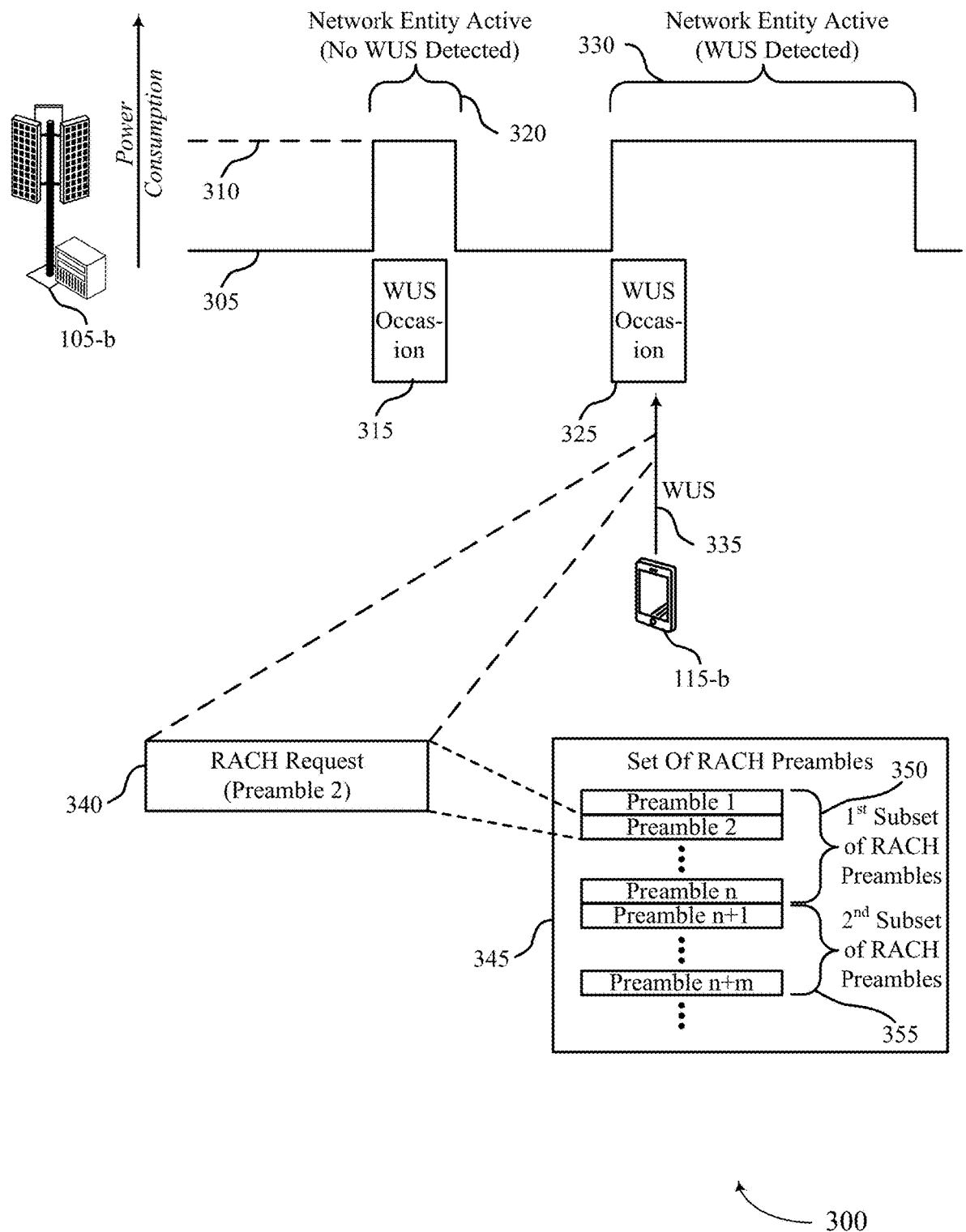
FIG. 3 illustrates an example of a wake-up signal timing that supports wake-up signal traffic indication techniques for wireless communications in accordance with one or more aspects of the present disclosure.

FIG. 3 illustrates an example of a WUS timing 300 that supports wake-up signal traffic indication techniques for wireless communications in accordance with one or more aspects of the present disclosure. The WSU timing 300 may be implemented by aspects of the wireless communications system 100 or 200. For example, a UE 115-b and network entity 105-b, which may be examples of UEs 115 and network entities 105 of FIGS. 1 and 2, may implement the WUS timing 300. As discussed herein, network entity 105-b may transition between a sleep mode 305 and an active mode 310, where the sleep mode 305 has lower power consumption than the active mode. A WUS configuration may be provided that may trigger the network entity 105-b to remain in the active mode 310 for communications, thus allowing for reduced network power consumption and efficient wake-up procedures, which may enhance overall network efficiency and user experience.

In the example of FIG. 3, the network entity 105-b enters sleep mode 305 that provides network power saving, in which periodic active modes 310 may be used to monitor for wake-up signals and maintain network operation. In some cases, a sleep procedure may be enabled at the network entity 105-b based on traffic loads that are being served. For example, during certain hours (e.g., night hours in office areas) there may have relatively light traffic or no traffic for a cell, and the sleep procedure may help save network power and operational cost. In some cases, different sleep modes may be configured, where some sleep modes will turn off RF chains at the network entity 105-b while others may not, and thus different sleep modes have different power consumption and require different transition times. However, one or more cells that may implement sleep modes that are served by the network entity 105-b may still have connections with UE 115-b, and thus the cell should be aware of whether the UE 115-b needs to go into a connected state or perform some SDT, so that the active mode 310 can be triggered. In the example of FIG. 3, the network entity 105-b may configure periodic occasions for monitoring for a WUS 335, which include a first WUS occasion 315 and a second WUS occasion 325 in this example. In this example, during active period 320 associated with the first WUS occasion 315, the network entity 105-b may not detect a WUS and may transition back to sleep mode 305. During active period 330 associated with second WUS occasion 325, the network entity 105-b may detect WUS 335 from the UE 115-b, and may maintain the active mode 310 beyond the duration of the second WUS occasion 325 in order to provide communications with the UE 115-b.

As discussed herein, the WUS 335 may take different forms such as a RACH preamble or PUCCH transmission. In the example of FIG. 3, the WUS 335 may be a RACH request 340 that includes a RACH preamble. In some cases, the RACH preamble may be selected from a set of RACH preambles 345, in which a first subset of RACH preambles 350 and a second subset of RACH preamble 355 may be associated with different sets of attributes of data traffic of the UE 115-b. In some cases, the traffic attributes may include one or more of a buffer status of the UE 115-b, an available power headroom at the UE 115-b, a signal priority associated with the data traffic, latency targets associated with the data traffic, or any combinations thereof. In some cases, the UE 115-b may also give a recommendation on how long the network should stay in the active mode 310 (e.g., a time duration T1). In some implementations, the first subset of RACH preambles 350 may be associated with a first set of attributes of the data traffic, and the second subset of RACH preambles 355 may be associated with a second set of attributes of the data traffic, and WUS configuration information may provide different attributes of data traffic that are associated with each subset of RACH preambles 350 and 355. In some cases, the WUS configuration information may be transmitted via RRC signaling as part of or after a connection establishment between the UE 115-b and the network entity 105-b. In other cases, other signaling may be used to convey the WUS configuration, such as system information signaling, one or more medium access control (MAC) control elements (CEs), or any combinations thereof.

In some cases, the WUS configuration may provide a table, such as in the below Table 1, in which different subsets or RACH preambles may be associated with different sets of traffic attributes:

TABLE 1

| Preamble Group | Buffer status | PHR | Priority | Latency Target | Requested T1 |
| --- | --- | --- | --- | --- | --- |
| A | Short buffer | X | Low | Low | A |
| B | Long buffer | Y | Low | Low | B |
| C | Short buffer | Z | High | High | C |

In this example, three subsets of RACH preambles are configured from a set of available RACH preambles, in which a first subset of RACH preambles (e.g., preamble group A) is associated with a short transmit buffer (e.g., where data in the UE 115-b transmit buffer is less than a threshold value provided with the WUS configuration), a first power headroom (PHR) status (e.g., where PHR at the UE 115-b is within a PHR range or above/below a PHR threshold value provided with the WUS configuration), a low traffic priority (e.g., a priority of the data traffic is below a priority threshold or in an associated priority category), a low latency target (e.g., a latency target of the data traffic is less than a latency threshold), and a first requested time duration (T1=A) of the active mode (e.g., a T1 value that is within a T1 range or above/below a T1 threshold value). In the example of Table 1, a second subset of RACH preambles (e.g., preamble group B) is associated with a long transmit buffer, a second PHR status, a low traffic priority, a low latency target, and a second requested time duration (T1=B). Likewise, a third subset of RACH preambles (e.g., preamble group C) is associated with a short transmit buffer, a third PHR status, a higher traffic priority, a higher latency target, and a third requested time duration (T1=C). It is to be understood that Table 1 is provided as one example of different subsets of RACH preambles and associated data traffic attributes, and numerous other examples of such tables may be readily formulated and are within the scope of the present disclosure, such as examples which may have more or fewer subsets of preambles, more of fewer corresponding traffic attributes, and the like. In other examples, additionally or alternatively, the WUS may be transmitted in a PUCCH transmission, such as illustrated in the example of FIG. 4.

Figure 4:
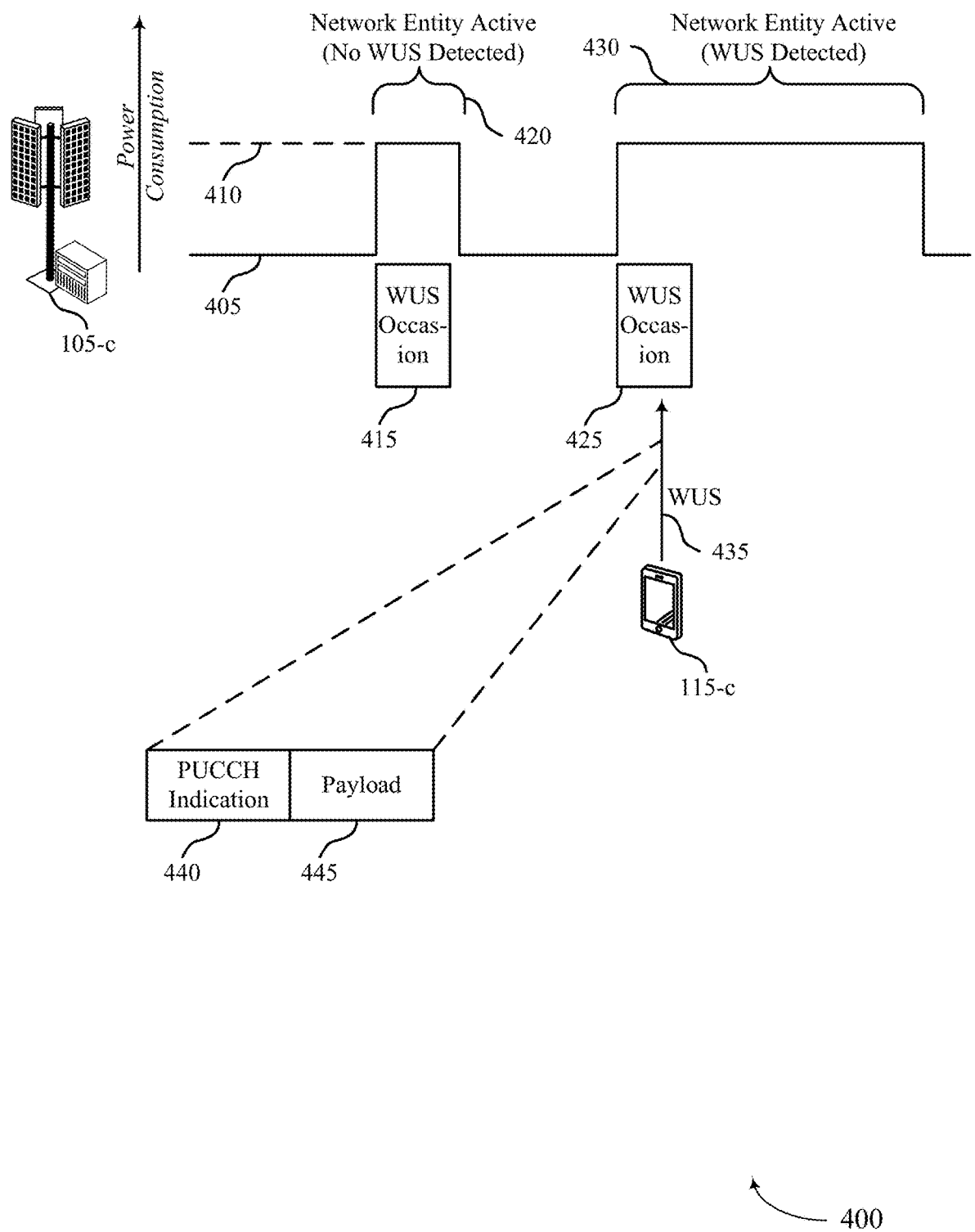
FIG. 4 illustrates an example of a wake-up signal timing that supports wake-up signal traffic indication techniques for wireless communications in accordance with one or more aspects of the present disclosure.

FIG. 4 illustrates an example of a wake-up signal timing 400 that supports wake-up signal traffic indication techniques for wireless communications in accordance with one or more aspects of the present disclosure. The WSU timing 400 may be implemented by aspects of the wireless communications system 100 or 200. For example, a UE 115-*c* and network entity 105-*c*, which may be examples of UEs 115 and network entities 105 of FIGS. 1 and 2, may implement the WUS timing 400. As discussed herein, network entity 105-*c* may transition between a sleep mode 405 and an active mode 410, where the sleep mode 405 has lower power consumption than the active mode 410. A WUS configuration may be provided that may trigger the network entity 105-*c* to remain in the active mode 410 for communications, thus allowing for reduced network power consumption and efficient wake-up procedures, which may enhance overall network efficiency and user experience.

In the example of FIG. 4, the network entity 105-*c* enters sleep mode 405 that provides network power saving, in which periodic active modes 410 may be used to monitor for wake-up signals and maintain network operation, similarly as discussed with reference to FIG. 3. In this example, the network entity 105-*c* again may configure periodic occasions for monitoring for a WUS 435, which include a first WUS occasion 415 and a second WUS occasion 425. In this example, during active period 420 associated with the first WUS occasion 415, the network entity 105-*c* may not detect a WUS and may transition back to sleep mode 405. During active period 430 associated with second WUS occasion 425, the network entity 105-*c* may detect WUS 435 from the UE 115-*c*, and may maintain the active mode 410 beyond the duration of the second WUS occasion 425 in order to provide communications with the UE 115-*c*.

In this example, the WUS 435 may be provided via a PUCCH, and may include a PUCCH indication 440 and a payload 445 that indicates one or more traffic attributes of data traffic at the UE 115-*c*. The payload 445 of the PUCCH may convey similar information as discussed with reference to FIG. 3, such as a size of the data buffer, a PHR status, a traffic priority, a latency target, a requested time duration (T1), or any combinations thereof. In some cases, separate fields for each traffic attribute may be provided in payload 445. In other cases, the network entity 105-*c* may configure a table with index values, in which each index value is associated with one or more traffic attributes similarly as discussed with reference to Table 1, and the payload 445 may include the index value associated with the one or more attributes.

In some cases, a UE 115 as discussed herein may monitor for one or more transmissions based on a particular WUS indication that is transmitted. For example, if the UE 115 indicated low latency target is associated with data in the transmit buffer, the UE 115 may monitor for a responsive downlink control channel (e.g., PDCCH) transmission in an earlier response window than if a higher latency target was indicated.

Figure 5:
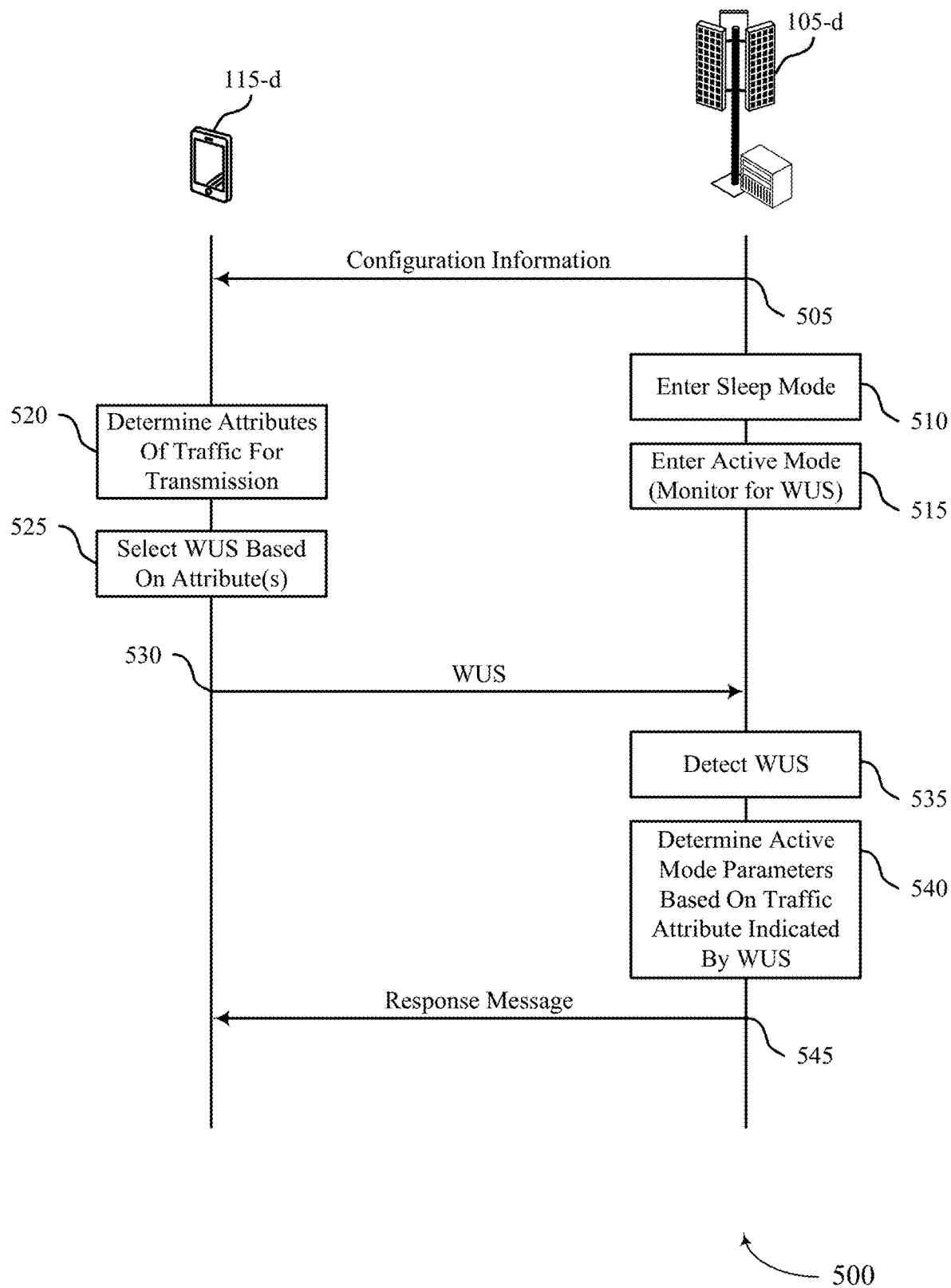
FIG. 5 illustrates an example of a process flow that supports wake-up signal traffic indication techniques for wireless communications in accordance with one or more aspects of the present disclosure.

FIG. 5 illustrates an example of a process flow 500 that supports wake-up signal traffic indication techniques for wireless communications in accordance with one or more aspects of the present disclosure. The process flow 500 may include a network entity 105-*d* and a UE 115-*d*, which may be examples of a network entity 105 and a UE 115 as described with reference to FIGS. 1 through 4. The process flow 500 may be implemented by the network entity 105-*d* and the UE 115-*d* where a WUS from the UE 115-*d* provides an indication of one or more attributes of data traffic that is present to be transmitted by the UE 115-*d*. Such techniques may provide for power savings at the network entity 105-*d* associated with a sleep mode, while also enabling faster indication of traffic attributes to the network entity 105-*d* which may adjust its behavior based on the WUS indication, which may thereby enhance overall network efficiency and user experience. In the following description of the process flow 500, the operations between the network entity 105-*d* and the UE 115-*d* may be performed in a different order than the example order shown. Some operations may be omitted from the process flow 500, and other operations may be added to the process flow 500.

At 505, the network entity 105-*d* may transmit, and the UE 115-*d* may receive, configuration information associated with WUS transmissions. As discussed herein, such configuration information may provide characteristics of WUS occasions, such as, for example, a duration of WUS occasions (e.g., a time duration or number of symbols/slots), a periodicity of WUS occasions (e.g., time period, number of symbols/slots and symbol/slot offset), a frequency band or bandwidth part (BWP), or any combinations thereof. In some cases, the configuration information may be provided via RRC signaling. In some cases, additionally or alternatively, the configuration information may be provided with one or more system information transmissions (e.g., SIB/MIB transmissions), in one or more control channel transmissions (e.g., in DCI), and/or in one or more MAC-CE transmissions.

At 510, the network entity 105-*d* may transition to a sleep mode. In some cases, the sleep mode may be a relatively low power mode at the network entity 105-*d* in which some or all transmit/receive components are powered down. At 515, the network entity 105-*d* may transition to an active mode to monitor for a WUS. In some cases, the transition to the active mode may be performed in accordance with a WUS occasion periodicity that is indicated in the configuration information.

At 520, the UE 115-*d* may identify that data traffic is present in a transmit buffer, and may determine one or more attributes of the data traffic. For example, the UE 115-*d* may determine a priority and latency target associated with the data traffic, an amount of data traffic that is present, a PHR of the UE 115-*d*, or any combinations thereof. In some cases, the UE 115-*d* may also identify a time duration (T1) that is likely to be used for transmission of the data traffic. At 525, the UE 115-*d* may select a WUS based on the one or more attributes of the data traffic. For example, the UE 115-*d* may select a RACH preamble or a PUCCH payload as discussed with reference to FIGS. 3 and 4.

At 530, the UE 115-*d* may transmit the WUS to the network entity 105-*d*. As discussed herein, the WUS may be transmitted during a WUS occasion, and the network entity 105-*d*, at 535, may detect the WUS. At 540, the network entity 105-*d* may determine one or more active mode parameters based on the one or more attributes indicated by the WUS. In some cases, the network entity 105-*d* may determine the one or more attributes based on a preamble that is used for the WUS, or a payload content of the WUS. The network entity 105-*d* may determine, for example, a time duration for the active mode (e.g., based on a T1 indication, buffer size indication, or both), resources that are to be allocated for associated data transmissions (e.g., based on a buffer size indication, a priority of the traffic, a latency target for the traffic, or any combinations thereof), one or more transmission parameters for an associated uplink transmissions (e.g., a MCS based on channel conditions and an indicated PHR), or any combinations thereof. At 545, the network entity 105-*d* may transmit a response message, which may be received at the UE 115-*d*. In some cases, a timing of the response message may be based on one or more attributes indicated by the WUS (e.g., a low latency indication in the WUS may prompt the response message transmission earlier in a response window, and a higher latency indication in the WUS may prompt the response message later in the response window). In some cases, the response message may include a random access response, or a DCI with a resource allocation for an associated uplink transmission.

Figure 6:
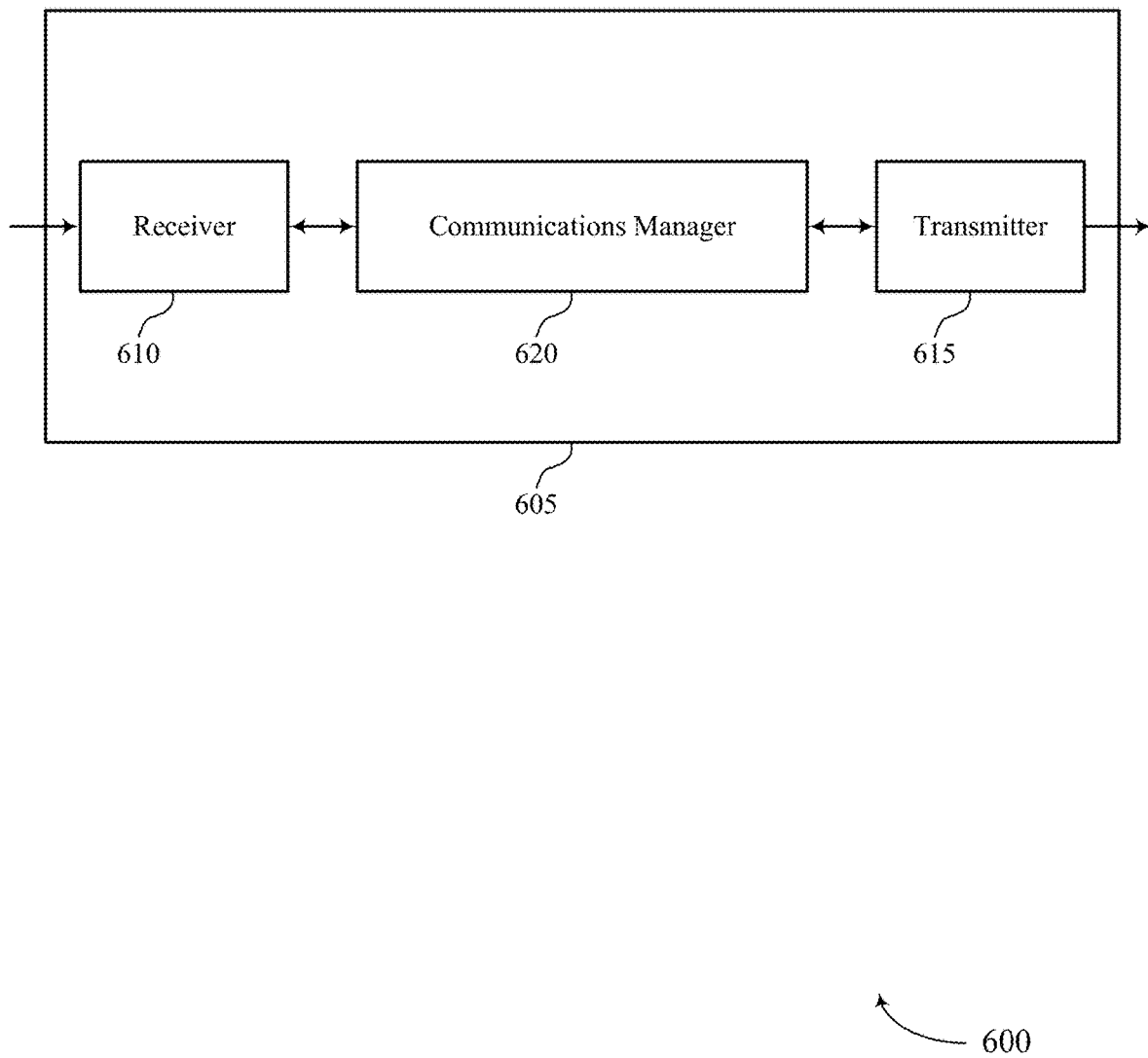
FIGS. 6 and 7 show block diagrams of devices that support wake-up signal traffic indication techniques for wireless communications in accordance with one or more aspects of the present disclosure.

FIG. 6 shows a block diagram 600 of a device 605 that supports wake-up signal traffic indication techniques for wireless communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to wake-up signal traffic indication techniques for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to wake-up signal traffic indication techniques for wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of wake-up signal traffic indication techniques for wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving configuration information for a wake-up signal transmission, the configuration information indicates a set of wake-up signals, each wake-up signal of the set of wake-up signals indicating one or more different attributes of traffic that is to be transmitted from the UE. The communications manager 620 may be configured as or otherwise support a means for selecting a first wake-up signal from the set of wake-up signals based on a first attribute of first traffic that is to be transmitted from the UE. The communications manager 620 may be configured as or otherwise support a means for transmitting the first wake-up signal during a wake-up signal occasion to indicate to a cell that the cell is requested to be in an active state for a time period outside of the wake-up signal occasion based on the first attribute indication of the first wake-up signal.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for WUS transmissions that indicate traffic attributes of a UE that is transmitting the WUS. Such techniques may provide for enhanced sleep and active mode transitions at a network entity, which may reduce network power consumption and allow for more efficient utilization of communication resources. Further, latency for communications may be reduced and reliability enhanced through indications of traffic priority or latency targets that may be used at the network entity to select active mode durations and parameters.

Figure 7:
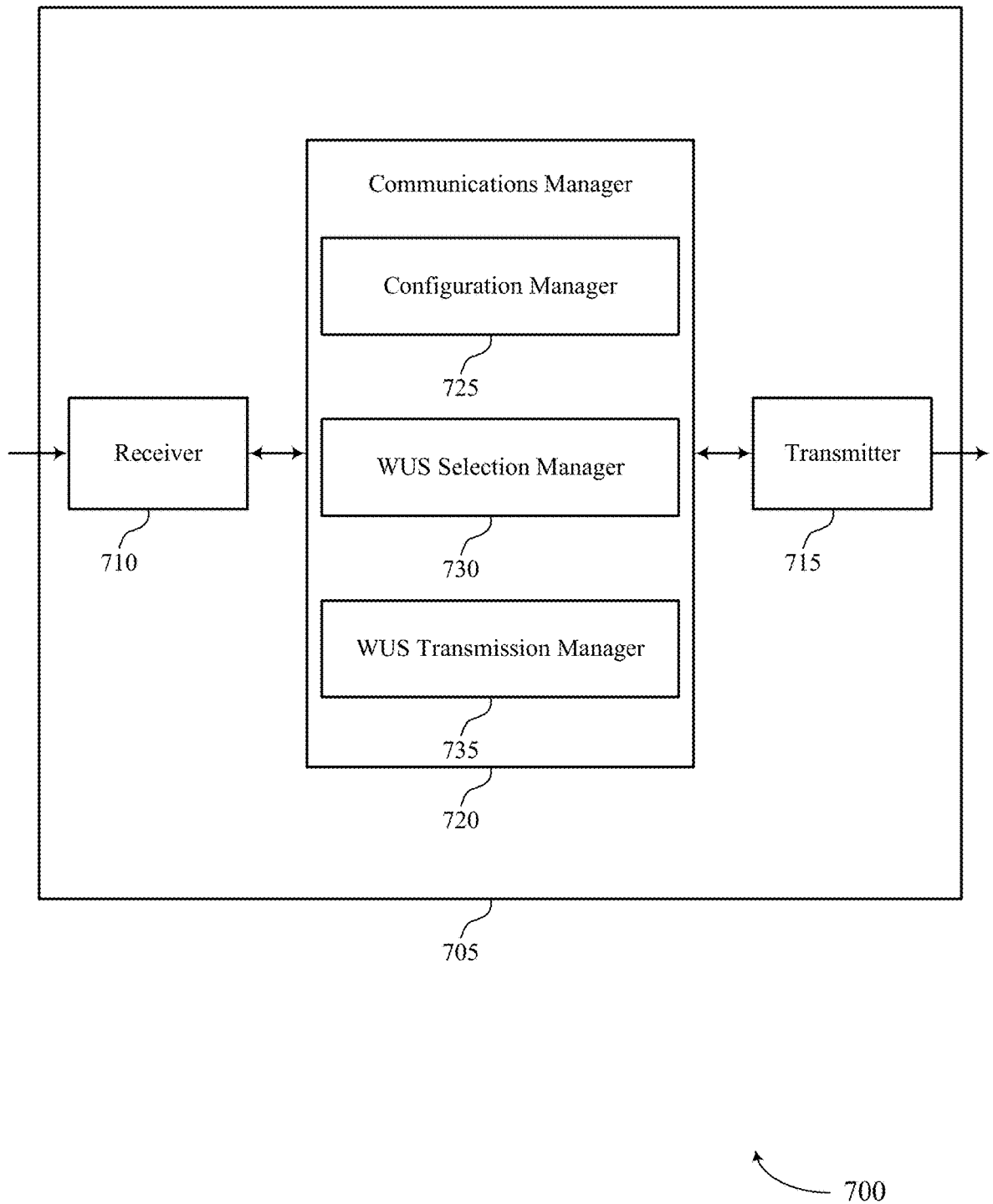

FIG. 7 shows a block diagram 700 of a device 705 that supports wake-up signal traffic indication techniques for wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to wake-up signal traffic indication techniques for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to wake-up signal traffic indication techniques for wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of wake-up signal traffic indication techniques for wireless communications as described herein. For example, the communications manager 720 may include a configuration manager 725, a WUS selection manager 730, a WUS transmission manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The configuration manager 725 may be configured as or otherwise support a means for receiving configuration information for a wake-up signal transmission, the configuration information indicates a set of wake-up signals, each wake-up signal of the set of wake-up signals indicating one or more different attributes of traffic that is to be transmitted from the UE. The WUS selection manager 730 may be configured as or otherwise support a means for selecting a first wake-up signal from the set of wake-up signals based on a first attribute of first traffic that is to be transmitted from the UE. The WUS transmission manager 735 may be configured as or otherwise support a means for transmitting the first wake-up signal during a wake-up signal occasion to indicate to a cell that the cell is requested to be in an active state for a time period outside of the wake-up signal occasion based on the first attribute indication of the first wake-up signal.

Figure 8:
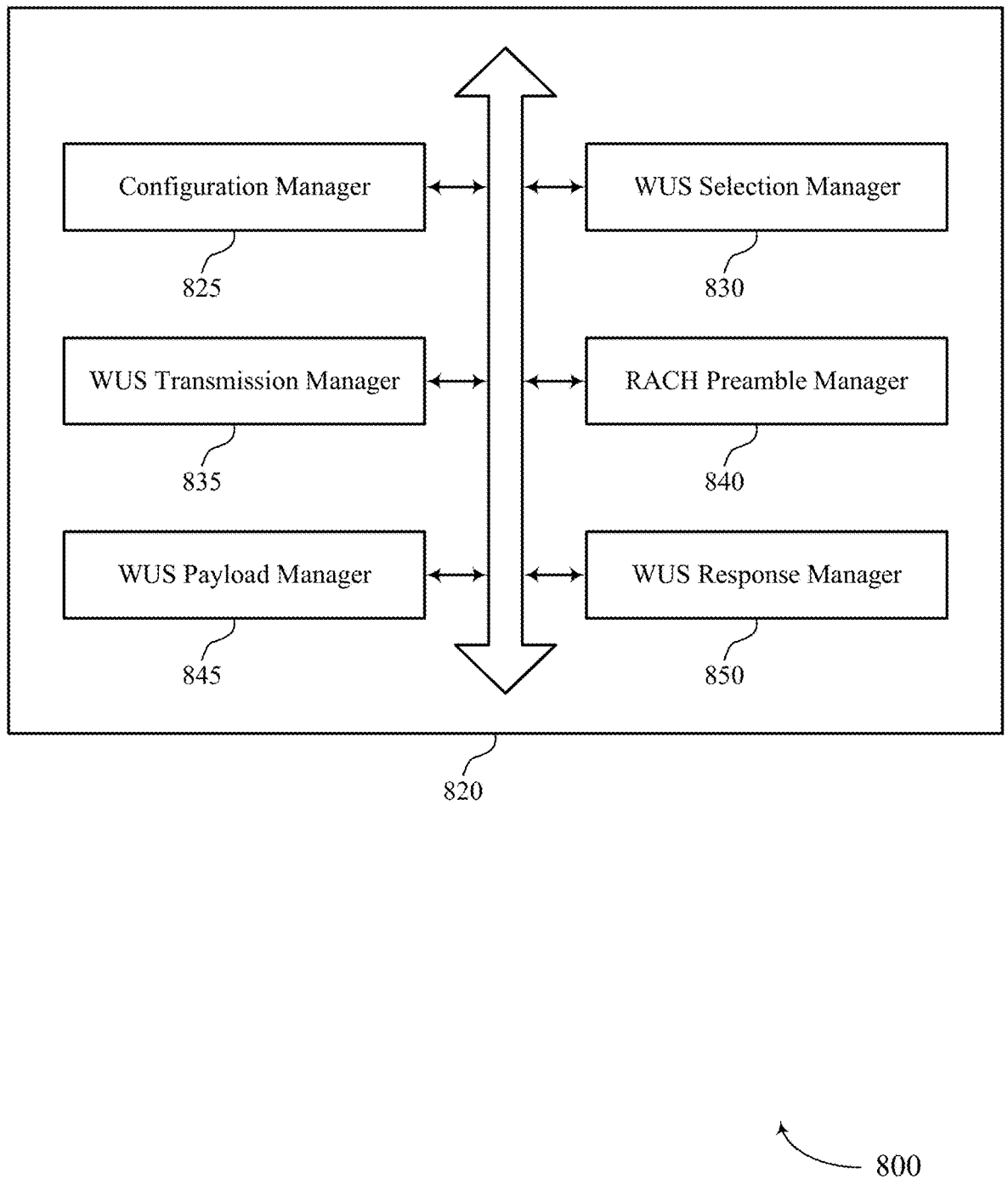
FIG. 8 shows a block diagram of a communications manager that supports wake-up signal traffic indication techniques for wireless communications in accordance with one or more aspects of the present disclosure.

FIG. 8 shows a block diagram 800 of a communications manager 820 that supports wake-up signal traffic indication techniques for wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of wake-up signal traffic indication techniques for wireless communications as described herein. For example, the communications manager 820 may include a configuration manager 825, a WUS selection manager 830, a WUS transmission manager 835, a RACH preamble manager 840, a WUS payload manager 845, a WUS response manager 850, or any combination thereof. Each of these components may communicate, directly or indirectly, with one another (e.g., via one or more buses).

The communications manager 820 may support wireless communication at a UE in accordance with examples as disclosed herein. The configuration manager 825 may be configured as or otherwise support a means for receiving configuration information for a wake-up signal transmission, the configuration information indicates a set of wake-up signals, each wake-up signal of the set of wake-up signals indicating one or more different attributes of traffic that is to be transmitted from the UE. The WUS selection manager 830 may be configured as or otherwise support a means for selecting a first wake-up signal from the set of wake-up signals based on a first attribute of first traffic that is to be transmitted from the UE. The WUS transmission manager 835 may be configured as or otherwise support a means for transmitting the first wake-up signal during a wake-up signal occasion to indicate to a cell that the cell is requested to be in an active state for a time period outside of the wake-up signal occasion based on the first attribute indication of the first wake-up signal. In some examples, the first wake-up signal is a random access request transmitted via a RACH, or is request that is transmitted via a control channel.

In some examples, to support selecting the first wake-up signal, the WUS selection manager 830 may be configured as or otherwise support a means for selecting the first wake-up signal from the set of wake-up signals based on a transmit buffer status of the UE, a power headroom available at the UE, a priority of the first traffic, a latency target of the first traffic, or any combinations thereof. In some examples, to support selecting the first wake-up signal, the WUS selection manager 830 may be configured as or otherwise support a means for selecting the first wake-up signal from the set of wake-up signals based on a time duration that the cell is requested to be in the active state.

In some examples, the set of wake-up signals includes a set of random access preambles, and one or more of the random access preambles are mapped to the one or more different attributes of traffic that is to be transmitted from the UE. In some examples, the set of random access preambles includes two or more different subsets of random access preambles, and where each of the two or more different subsets of random access preambles are mapped to the one or more different attributes of traffic that is to be transmitted from the UE.

In some examples, the configuration information is received via RRC signaling. In some examples, the RRC signaling maps each subset of the two or more different subsets of random access preambles to a different combination of two or more attributes of traffic that is to be transmitted from the UE.

In some examples, to support transmitting the first wake-up signal, the WUS payload manager 845 may be configured as or otherwise support a means for transmitting an uplink control channel transmission that includes a payload that indicates the one or more different attributes of traffic that is to be transmitted from the UE. In some examples, the payload includes an index value of a set of index values, where each index value of the set of index values is mapped to a different combination of two or more attributes of traffic that is to be transmitted from the UE.

In some examples, the WUS response manager 850 may be configured as or otherwise support a means for monitoring for a response communication from the cell based on the first attribute indication of the first wake-up signal. In some examples, to support monitoring, the WUS response manager 850 may be configured as or otherwise support a means for monitoring for a downlink control channel communication in a time window that is based on a latency associated with the first attribute indication of the first wake-up signal.

Figure 9:
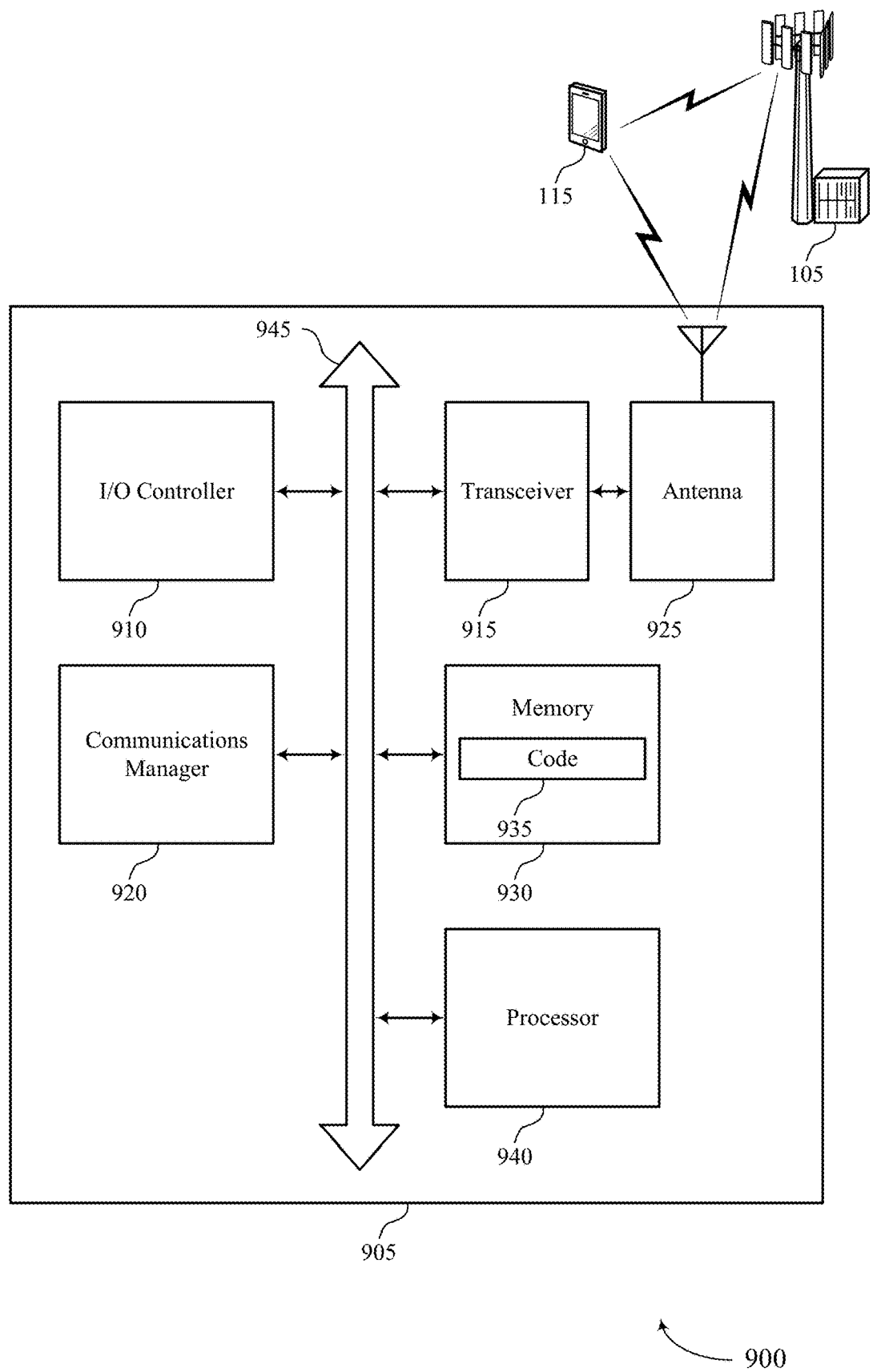
FIG. 9 shows a diagram of a system including a device that supports wake-up signal traffic indication techniques for wireless communications in accordance with one or more aspects of the present disclosure.

FIG. 9 shows a diagram of a system 900 including a device 905 that supports wake-up signal traffic indication techniques for wireless communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting wake-up signal traffic indication techniques for wireless communications). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving configuration information for a wake-up signal transmission, the configuration information indicates a set of wake-up signals, each wake-up signal of the set of wake-up signals indicating one or more different attributes of traffic that is to be transmitted from the UE. The communications manager 920 may be configured as or otherwise support a means for selecting a first wake-up signal from the set of wake-up signals based on a first attribute of first traffic that is to be transmitted from the UE. The communications manager 920 may be configured as or otherwise support a means for transmitting the first wake-up signal during a wake-up signal occasion to indicate to a cell that the cell is requested to be in an active state for a time period outside of the wake-up signal occasion based on the first attribute indication of the first wake-up signal.

By including or configuring the communications manager 920 in accordance with examples as described herein, the device 905 may support techniques for WUS transmissions that indicate traffic attributes of a UE that is transmitting the WUS. Such techniques may provide for enhanced sleep and active mode transitions at a network entity, which may reduce network power consumption and allow for more efficient utilization of communication resources. Further, latency for communications may be reduced and reliability enhanced through indications of traffic priority or latency targets that may be used at the network entity to select active mode durations and parameters.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of wake-up signal traffic indication techniques for wireless communications as described herein, or the processor 940 and the memory 930 may be otherwise configured to perform or support such operations.

Figure 10:
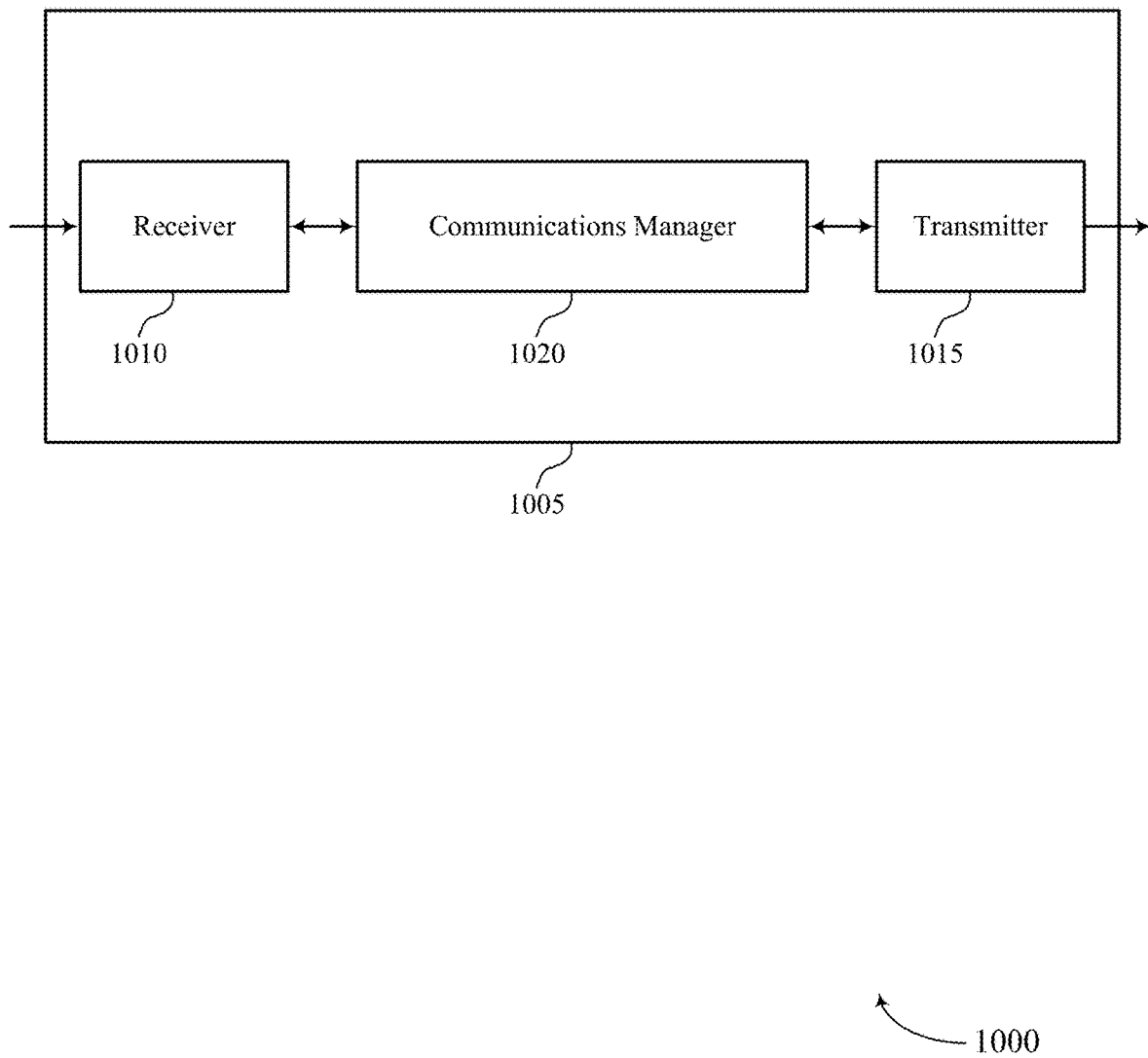
FIGS. 10 and 11 show block diagrams of devices that support wake-up signal traffic indication techniques for wireless communications in accordance with one or more aspects of the present disclosure.

FIG. 10 shows a block diagram 1000 of a device 1005 that supports wake-up signal traffic indication techniques for wireless communications in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of wake-up signal traffic indication techniques for wireless communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting configuration information to a UE for a wake-up signal transmission, the configuration information indicates a set of wake-up signals, each wake-up signal of the set of wake-up signals indicating one or more different attributes of traffic that is to be transmitted from the UE. The communications manager 1020 may be configured as or otherwise support a means for receiving a first wake-up signal from the UE during a wake-up signal monitoring occasion. The communications manager 1020 may be configured as or otherwise support a means for determining one or more parameters associated with a transition to an active state for communications with the UE based on a first attribute of first traffic that is to be transmitted from the UE, the first attribute indicated by the first wake-up signal.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for WUS transmissions that indicate traffic attributes of a UE that is transmitting the WUS. Such techniques may provide for enhanced sleep and active mode transitions at a network entity, which may reduce network power consumption and allow for more efficient utilization of communication resources. Further, latency for communications may be reduced and reliability enhanced through indications of traffic priority or latency targets that may be used at the network entity to select active mode durations and parameters.

Figure 11:
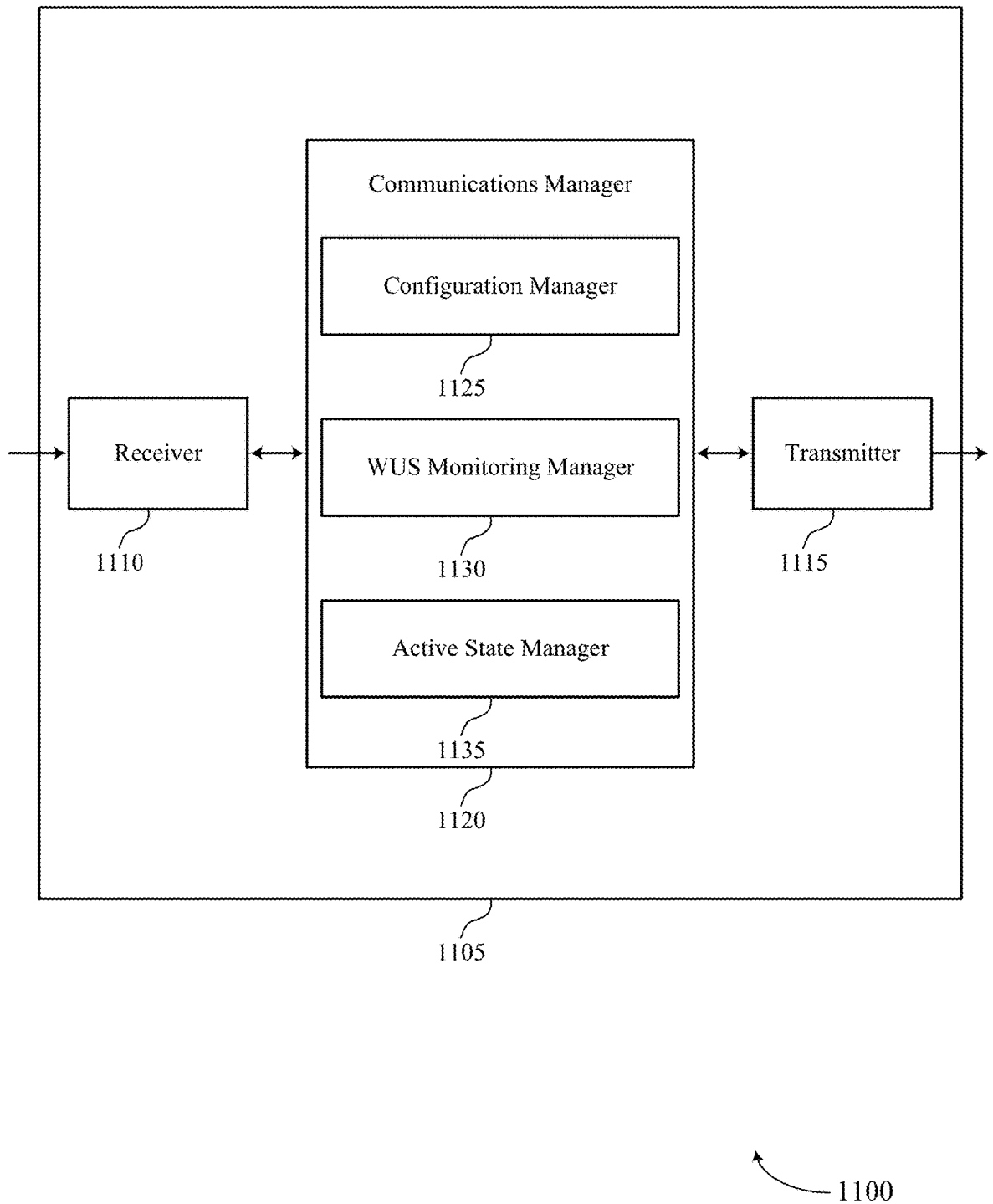

FIG. 11 shows a block diagram 1100 of a device 1105 that supports wake-up signal traffic indication techniques for wireless communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of wake-up signal traffic indication techniques for wireless communications as described herein. For example, the communications manager 1120 may include a configuration manager 1125, a WUS monitoring manager 1130, an active state manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The configuration manager 1125 may be configured as or otherwise support a means for transmitting configuration information to a UE for a wake-up signal transmission, the configuration information indicates a set of wake-up signals, each wake-up signal of the set of wake-up signals indicating one or more different attributes of traffic that is to be transmitted from the UE. The WUS monitoring manager 1130 may be configured as or otherwise support a means for receiving a first wake-up signal from the UE during a wake-up signal monitoring occasion. The active state manager 1135 may be configured as or otherwise support a means for determining one or more parameters associated with a transition to an active state for communications with the UE based on a first attribute of first traffic that is to be transmitted from the UE, the first attribute indicated by the first wake-up signal.

Figure 12:
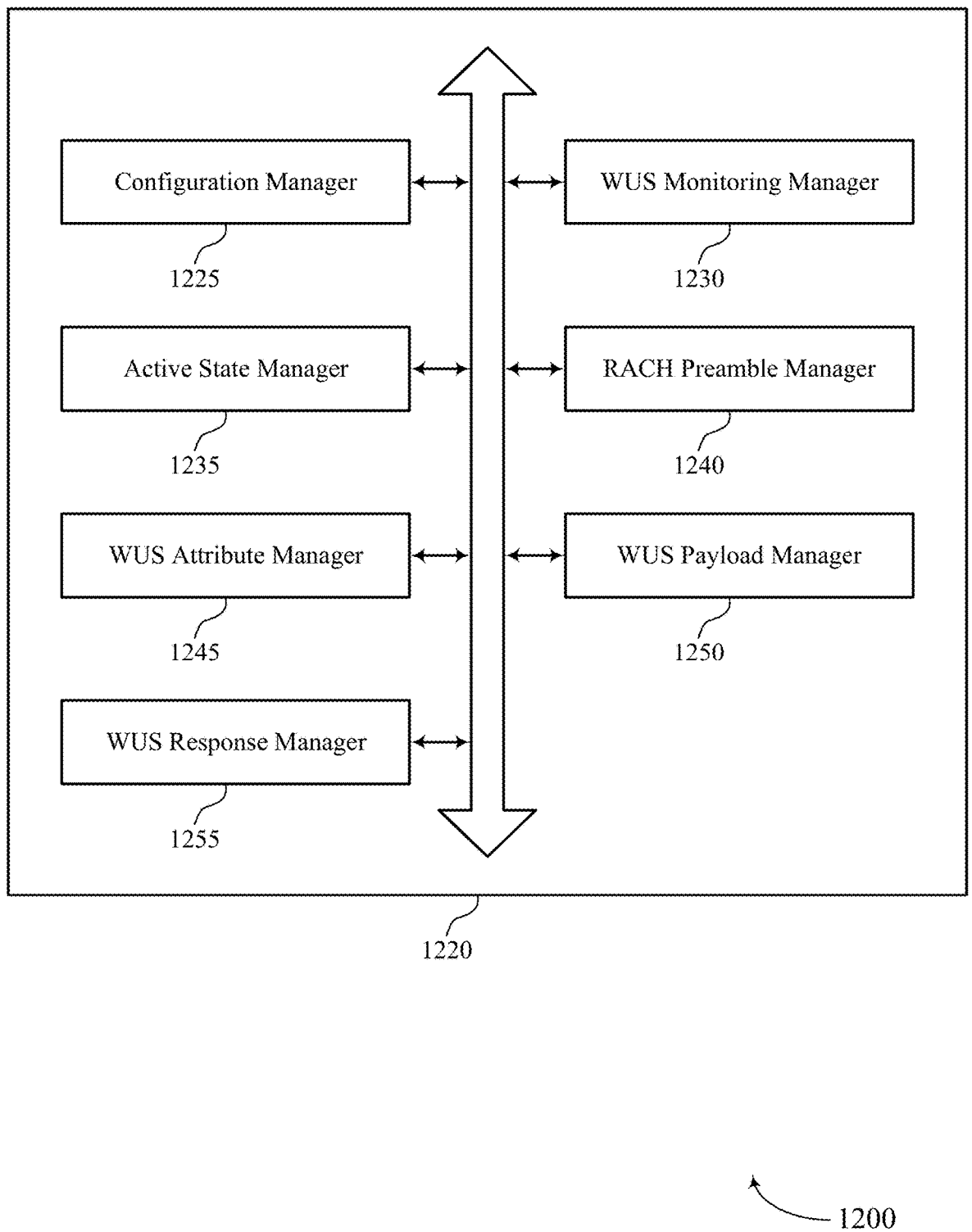
FIG. 12 shows a block diagram of a communications manager that supports wake-up signal traffic indication techniques for wireless communications in accordance with one or more aspects of the present disclosure.

FIG. 12 shows a block diagram 1200 of a communications manager 1220 that supports wake-up signal traffic indication techniques for wireless communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of wake-up signal traffic indication techniques for wireless communications as described herein. For example, the communications manager 1220 may include a configuration manager 1225, a WUS monitoring manager 1230, an active state manager 1235, a RACH preamble manager 1240, a WUS attribute manager 1245, a WUS payload manager 1250, a WUS response manager 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The configuration manager 1225 may be configured as or otherwise support a means for transmitting configuration information to a UE for a wake-up signal transmission, the configuration information indicates a set of wake-up signals, each wake-up signal of the set of wake-up signals indicating one or more different attributes of traffic that is to be transmitted from the UE. The WUS monitoring manager 1230 may be configured as or otherwise support a means for receiving a first wake-up signal from the UE during a wake-up signal monitoring occasion. The active state manager 1235 may be configured as or otherwise support a means for determining one or more parameters associated with a transition to an active state for communications with the UE based on a first attribute of first traffic that is to be transmitted from the UE, the first attribute indicated by the first wake-up signal.

In some examples, the first wake-up signal is a random access request transmitted via a RACH, or is request that is transmitted via a control channel. In some examples, the one or more different attributes of traffic that is to be transmitted from the UE include one or more of a transmit buffer status of the UE, a power headroom available at the UE, a priority of the first traffic, a latency target of the first traffic, or any combinations thereof. In some examples, the first wake-up signal further indicates a time duration requested for the active state for communications with the UE.

In some examples, the set of wake-up signals includes a set of random access preambles, and one or more of the random access preambles are mapped to the one or more different attributes of traffic that is to be transmitted from the UE. In some examples, the set of random access preambles includes two or more different subsets of random access preambles, and where each of the two or more different subsets of random access preambles are mapped to the one or more different attributes of traffic that is to be transmitted from the UE.

In some examples, the configuration information is transmitted via RRC signaling. In some examples, the RRC signaling maps each subset of the two or more different subsets of random access preambles to a different combination of two or more attributes of traffic that is to be transmitted from the UE.

In some examples, to support receiving the first wake-up signal, the WUS payload manager 1250 may be configured as or otherwise support a means for receiving an uplink control channel transmission that includes a payload that indicates the one or more different attributes of traffic that is to be transmitted from the UE. In some examples, the payload includes an index value of a set of index values, where each index value of the set of index values is mapped to a different combination of two or more attributes of traffic that is to be transmitted from the UE.

In some examples, the WUS response manager 1255 may be configured as or otherwise support a means for transmitting a response communication to the UE based on the first attribute indicated by the first wake-up signal. In some examples, a timing for transmission of the response communication is based on a latency associated with the first attribute indicated by the first wake-up signal.

Figure 13:
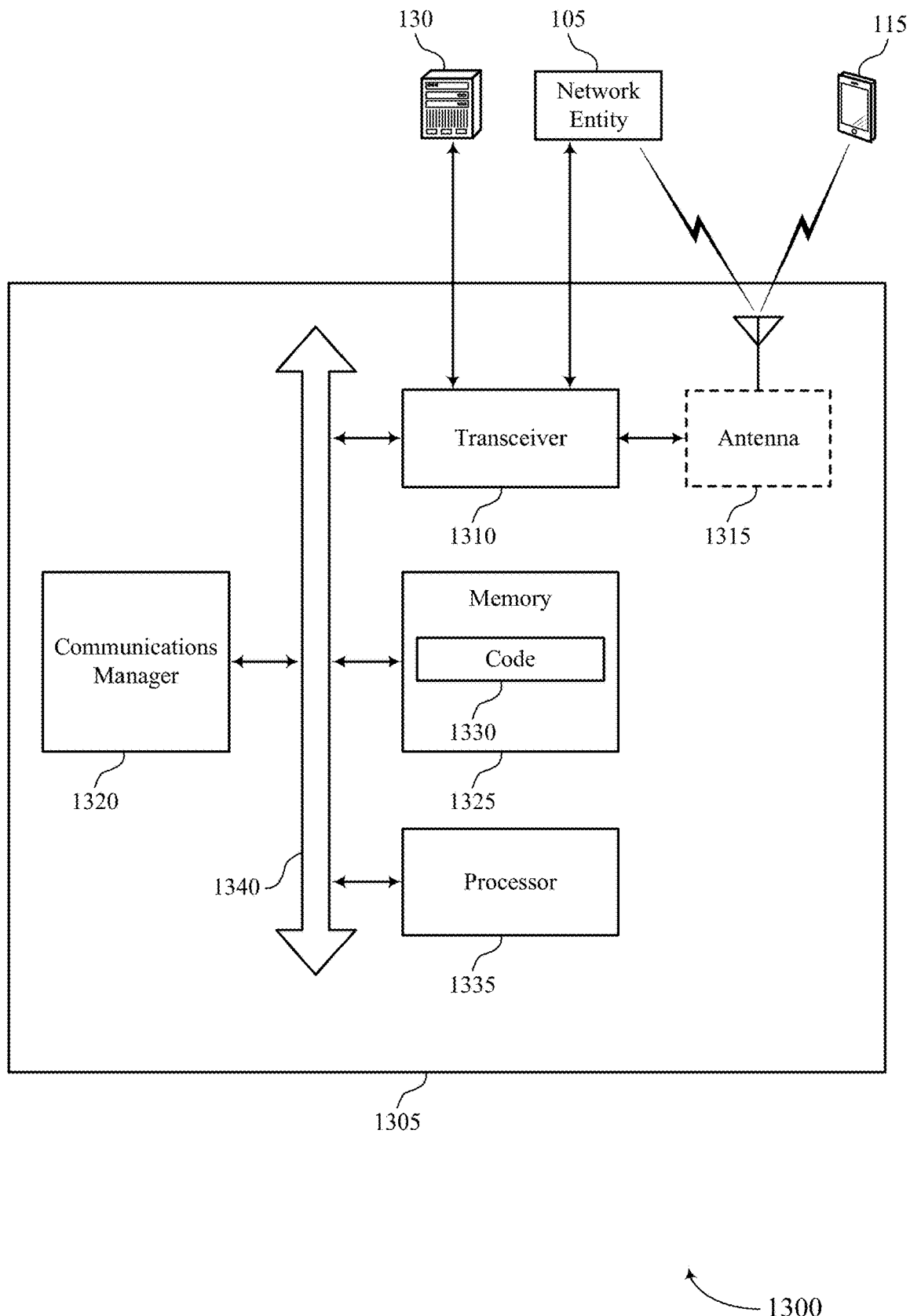
FIG. 13 shows a diagram of a system including a device that supports wake-up signal traffic indication techniques for wireless communications in accordance with one or more aspects of the present disclosure.

FIG. 13 shows a diagram of a system 1300 including a device 1305 that supports wake-up signal traffic indication techniques for wireless communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting wake-up signal traffic indication techniques for wireless communications). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305).

For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting configuration information to a UE for a wake-up signal transmission, the configuration information indicates a set of wake-up signals, each wake-up signal of the set of wake-up signals indicating one or more different attributes of traffic that is to be transmitted from the UE. The communications manager 1320 may be configured as or otherwise support a means for receiving a first wake-up signal from the UE during a wake-up signal monitoring occasion. The communications manager 1320 may be configured as or otherwise support a means for determining one or more parameters associated with a transition to an active state for communications with the UE based on a first attribute of first traffic that is to be transmitted from the UE, the first attribute indicated by the first wake-up signal.

By including or configuring the communications manager 1320 in accordance with examples as described herein, the device 1305 may support techniques for WUS transmissions that indicate traffic attributes of a UE that is transmitting the WUS. Such techniques may provide for enhanced sleep and active mode transitions at a network entity, which may reduce network power consumption and allow for more efficient utilization of communication resources. Further, latency for communications may be reduced and reliability enhanced through indications of traffic priority or latency targets that may be used at the network entity to select active mode durations and parameters.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of wake-up signal traffic indication techniques for wireless communications as described herein, or the processor 1335 and the memory 1325 may be otherwise configured to perform or support such operations.

Figure 14:
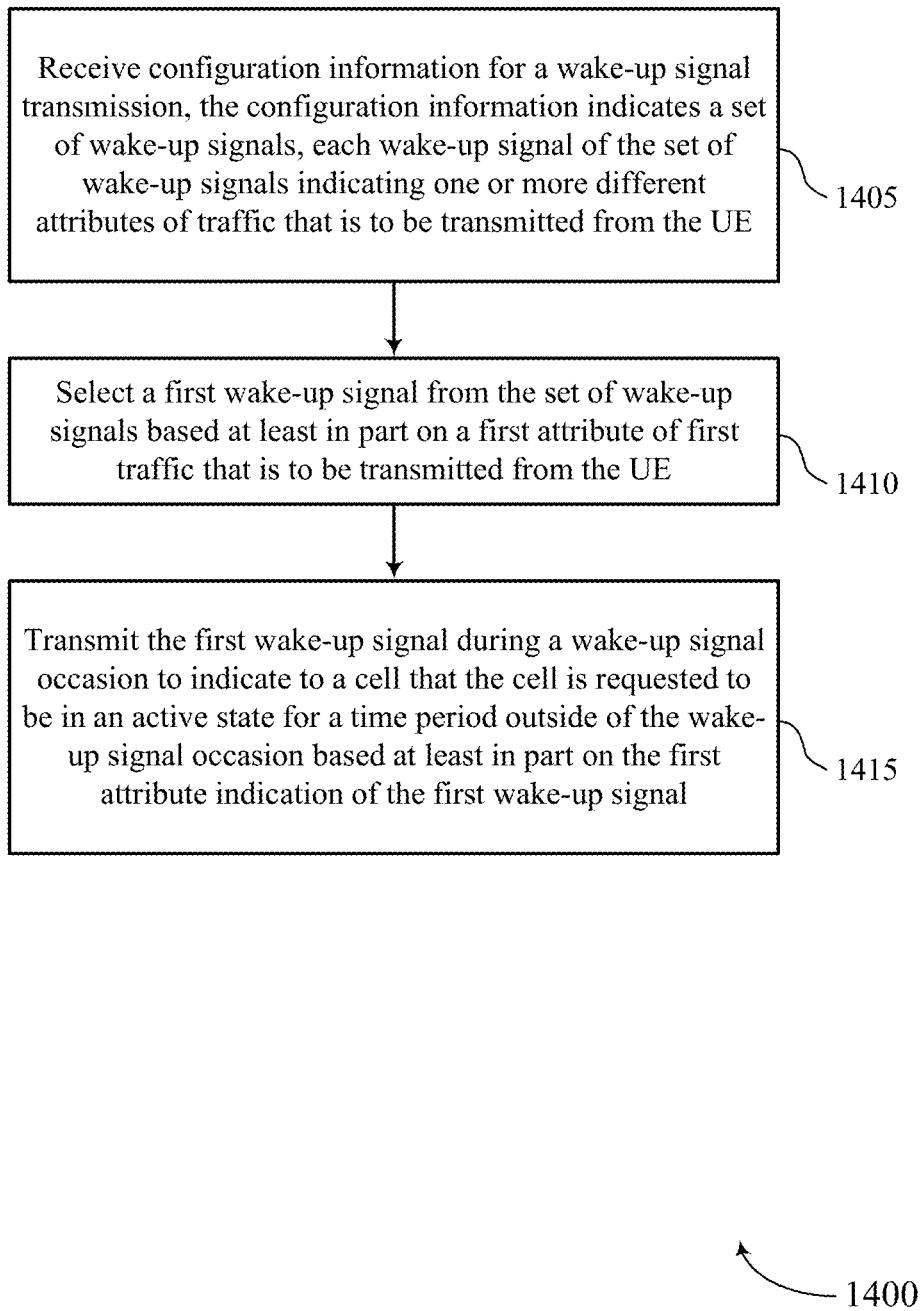
FIGS. 14 through 19 show flowcharts illustrating methods that support wake-up signal traffic indication techniques for wireless communications in accordance with one or more aspects of the present disclosure.

FIG. 14 shows a flowchart illustrating a method 1400 that supports wake-up signal traffic indication techniques for wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving configuration information for a wake-up signal transmission, the configuration information indicates a set of wake-up signals, each wake-up signal of the set of wake-up signals indicating one or more different attributes of traffic that is to be transmitted from the UE. The operations of 1405 may be performed in accordance with examples as disclosed herein. In some examples, aspects of the operations of 1405 may be performed by a configuration manager 825 as described with reference to FIG. 8.

At 1410, the method may include selecting a first wake-up signal from the set of wake-up signals based on a first attribute of first traffic that is to be transmitted from the UE. The operations of 1410 may be performed in accordance with examples as disclosed herein. In some examples, aspects of the operations of 1410 may be performed by a WUS selection manager 830 as described with reference to FIG. 8.

At 1415, the method may include transmitting the first wake-up signal during a wake-up signal occasion to indicate to a cell that the cell is requested to be in an active state for a time period outside of the wake-up signal occasion based on the first attribute indication of the first wake-up signal. The operations of 1415 may be performed in accordance with examples as disclosed herein. In some examples, aspects of the operations of 1415 may be performed by a WUS transmission manager 835 as described with reference to FIG. 8.

Figure 15:
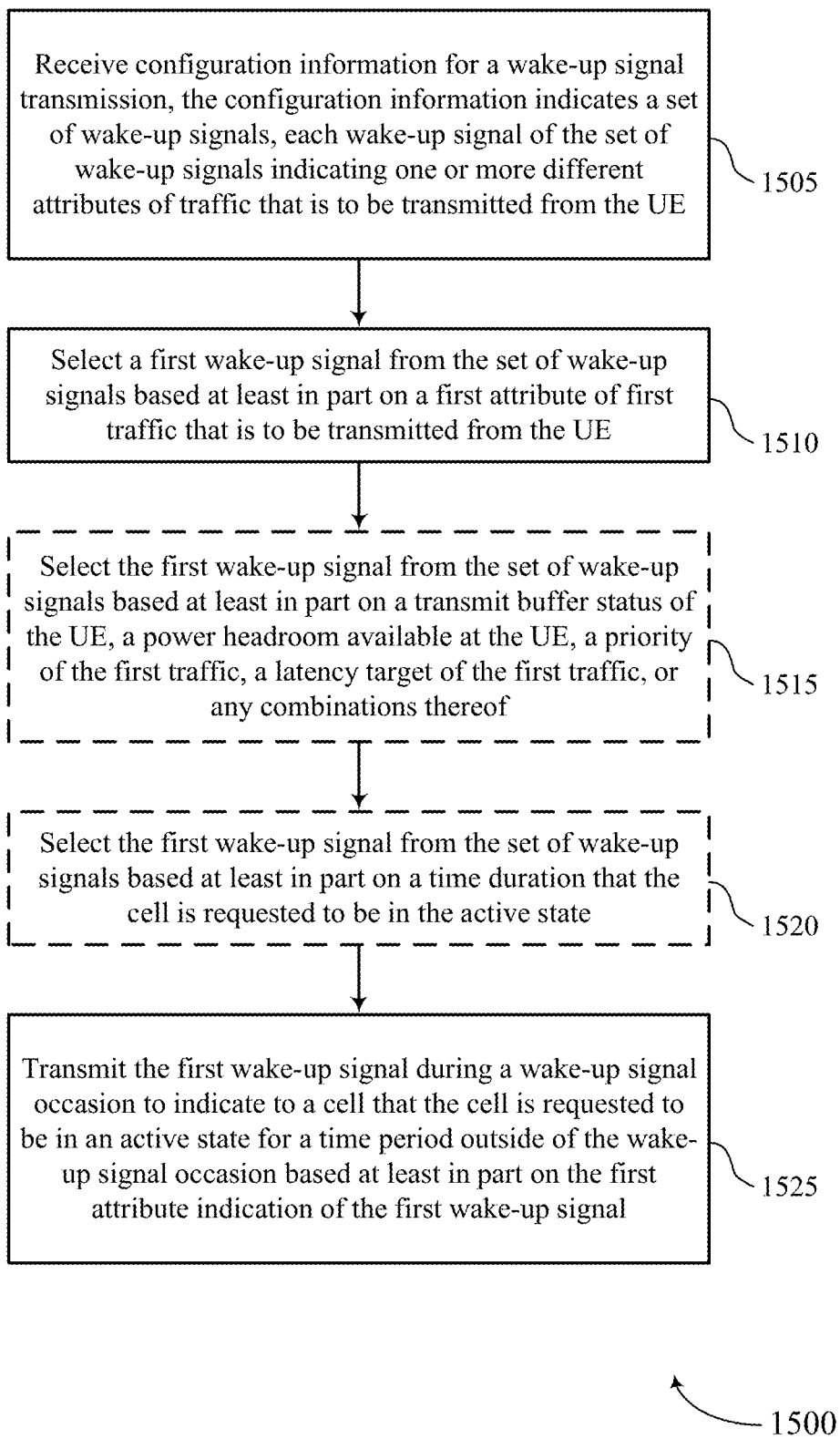

FIG. 15 shows a flowchart illustrating a method 1500 that supports wake-up signal traffic indication techniques for wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving configuration information for a wake-up signal transmission, the configuration information indicates a set of wake-up signals, each wake-up signal of the set of wake-up signals indicating one or more different attributes of traffic that is to be transmitted from the UE. The operations of 1505 may be performed in accordance with examples as disclosed herein. In some examples, aspects of the operations of 1505 may be performed by a configuration manager 825 as described with reference to FIG. 8.

At 1510, the method may include selecting a first wake-up signal from the set of wake-up signals based on a first attribute of first traffic that is to be transmitted from the UE. The operations of 1510 may be performed in accordance with examples as disclosed herein. In some examples, aspects of the operations of 1510 may be performed by a WUS selection manager 830 as described with reference to FIG. 8.

In some implementations, at 1515, the method optionally may include selecting the first wake-up signal from the set of wake-up signals based on a transmit buffer status of the UE, a power headroom available at the UE, a priority of the first traffic, a latency target of the first traffic, or any combinations thereof. The operations of 1515 may be performed in accordance with examples as disclosed herein. In some examples, aspects of the operations of 1515 may be performed by a WUS selection manager 830 as described with reference to FIG. 8.

In some implementations, at 1520, the method optionally may include selecting the first wake-up signal from the set of wake-up signals based on a time duration that the cell is requested to be in the active state. The operations of 1520 may be performed in accordance with examples as disclosed herein. In some examples, aspects of the operations of 1520 may be performed by a WUS selection manager 830 as described with reference to FIG. 8.

At 1525, the method may include transmitting the first wake-up signal during a wake-up signal occasion to indicate to a cell that the cell is requested to be in an active state for a time period outside of the wake-up signal occasion based on the first attribute indication of the first wake-up signal. The operations of 1525 may be performed in accordance with examples as disclosed herein. In some examples, aspects of the operations of 1525 may be performed by a WUS transmission manager 835 as described with reference to FIG. 8.

Figure 16:
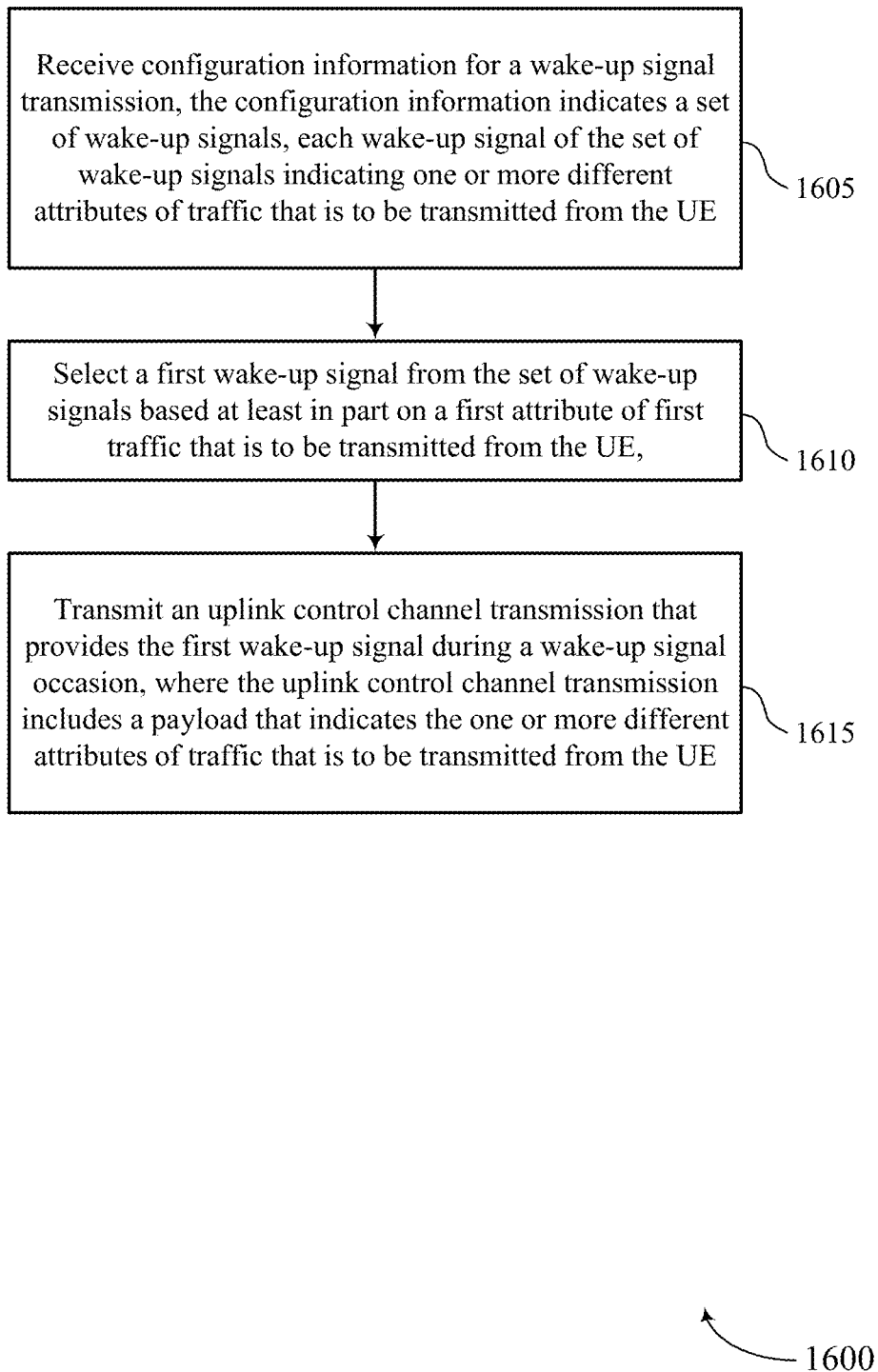

FIG. 16 shows a flowchart illustrating a method 1600 that supports wake-up signal traffic indication techniques for wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving configuration information for a wake-up signal transmission, the configuration information indicates a set of wake-up signals, each wake-up signal of the set of wake-up signals indicating one or more different attributes of traffic that is to be transmitted from the UE. The operations of 1605 may be performed in accordance with examples as disclosed herein. In some examples, aspects of the operations of 1605 may be performed by a configuration manager 825 as described with reference to FIG. 8.

At 1610, the method may include selecting a first wake-up signal from the set of wake-up signals based on a first attribute of first traffic that is to be transmitted from the UE. The operations of 1610 may be performed in accordance with examples as disclosed herein. In some examples, aspects of the operations of 1610 may be performed by a WUS selection manager 830 as described with reference to FIG. 8.

At 1615, the method may include transmitting an uplink control channel transmission that provides the first wake-up signal during a wake-up signal occasion, where the uplink control channel transmission includes a payload that indicates the one or more different attributes of traffic that is to be transmitted from the UE. The operations of 1615 may be performed in accordance with examples as disclosed herein. In some examples, aspects of the operations of 1615 may be performed by a WUS payload manager 845 as described with reference to FIG. 8.

Figure 17:
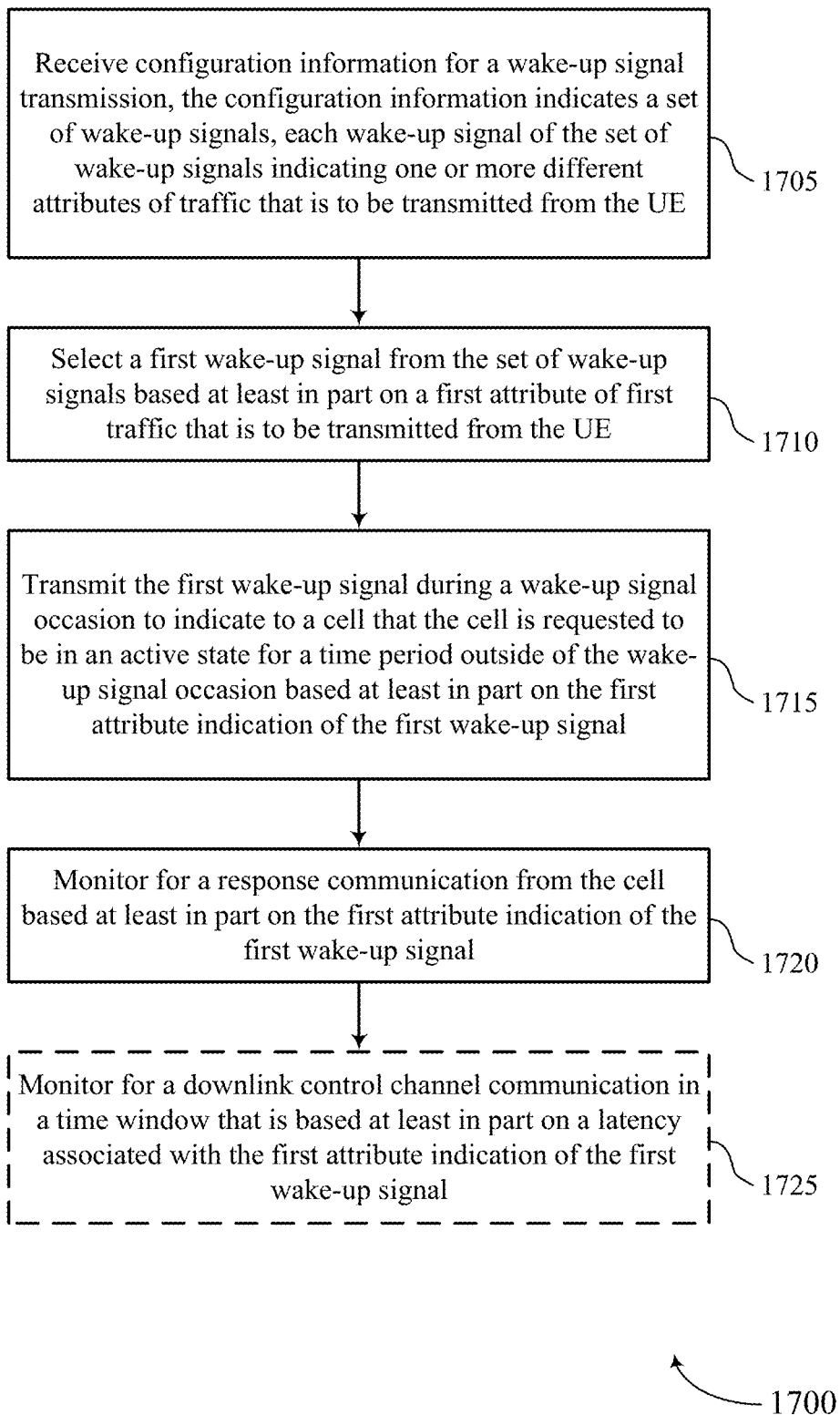

FIG. 17 shows a flowchart illustrating a method 1700 that supports wake-up signal traffic indication techniques for wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving configuration information for a wake-up signal transmission, the configuration information indicates a set of wake-up signals, each wake-up signal of the set of wake-up signals indicating one or more different attributes of traffic that is to be transmitted from the UE. The operations of 1705 may be performed in accordance with examples as disclosed herein. In some examples, aspects of the operations of 1705 may be performed by a configuration manager 825 as described with reference to FIG. 8.

At 1710, the method may include selecting a first wake-up signal from the set of wake-up signals based on a first attribute of first traffic that is to be transmitted from the UE. The operations of 1710 may be performed in accordance with examples as disclosed herein. In some examples, aspects of the operations of 1710 may be performed by a WUS selection manager 830 as described with reference to FIG. 8.

At 1715, the method may include transmitting the first wake-up signal during a wake-up signal occasion to indicate to a cell that the cell is requested to be in an active state for a time period outside of the wake-up signal occasion based on the first attribute indication of the first wake-up signal. The operations of 1715 may be performed in accordance with examples as disclosed herein. In some examples, aspects of the operations of 1715 may be performed by a WUS transmission manager 835 as described with reference to FIG. 8.

At 1720, the method may include monitoring for a response communication from the cell based on the first attribute indication of the first wake-up signal. The operations of 1720 may be performed in accordance with examples as disclosed herein. In some examples, aspects of the operations of 1720 may be performed by a WUS response manager 850 as described with reference to FIG. 8.

In some implementations, at 1725, the method optionally may include monitoring for a downlink control channel communication in a time window that is based on a latency associated with the first attribute indication of the first wake-up signal. The operations of 1725 may be performed in accordance with examples as disclosed herein. In some examples, aspects of the operations of 1725 may be performed by a WUS response manager 850 as described with reference to FIG. 8.

Figure 18:
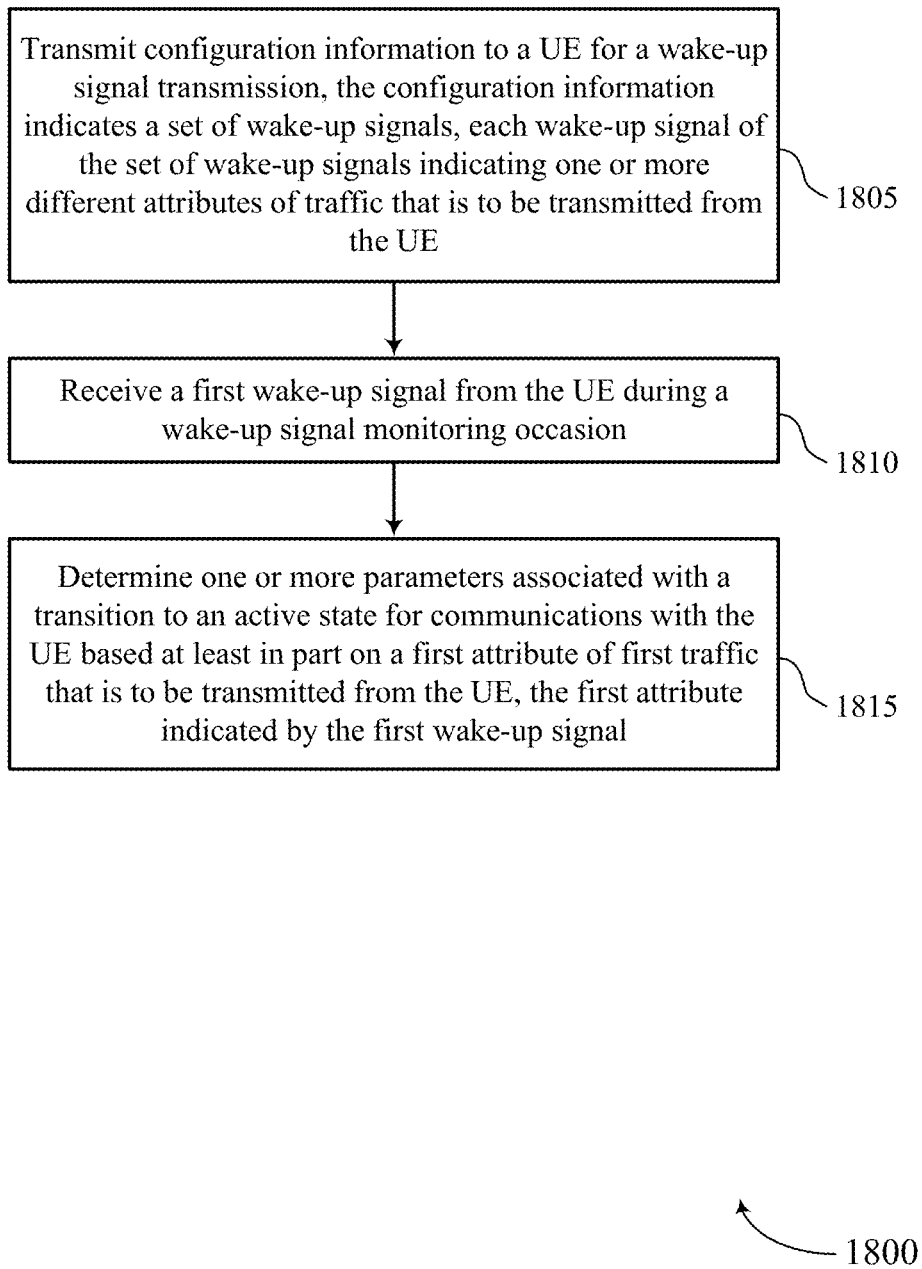

FIG. 18 shows a flowchart illustrating a method 1800 that supports wake-up signal traffic indication techniques for wireless communications in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting configuration information to a UE for a wake-up signal transmission, the configuration information indicates a set of wake-up signals, each wake-up signal of the set of wake-up signals indicating one or more different attributes of traffic that is to be transmitted from the UE. The operations of 1805 may be performed in accordance with examples as disclosed herein. In some examples, aspects of the operations of 1805 may be performed by a configuration manager 1225 as described with reference to FIG. 12.

At 1810, the method may include receiving a first wake-up signal from the UE during a wake-up signal monitoring occasion. The operations of 1810 may be performed in accordance with examples as disclosed herein. In some examples, aspects of the operations of 1810 may be performed by a WUS monitoring manager 1230 as described with reference to FIG. 12.

At 1815, the method may include determining one or more parameters associated with a transition to an active state for communications with the UE based on a first attribute of first traffic that is to be transmitted from the UE, the first attribute indicated by the first wake-up signal. The operations of 1815 may be performed in accordance with examples as disclosed herein. In some examples, aspects of the operations of 1815 may be performed by an active state manager 1235 as described with reference to FIG. 12.

Figure 19:
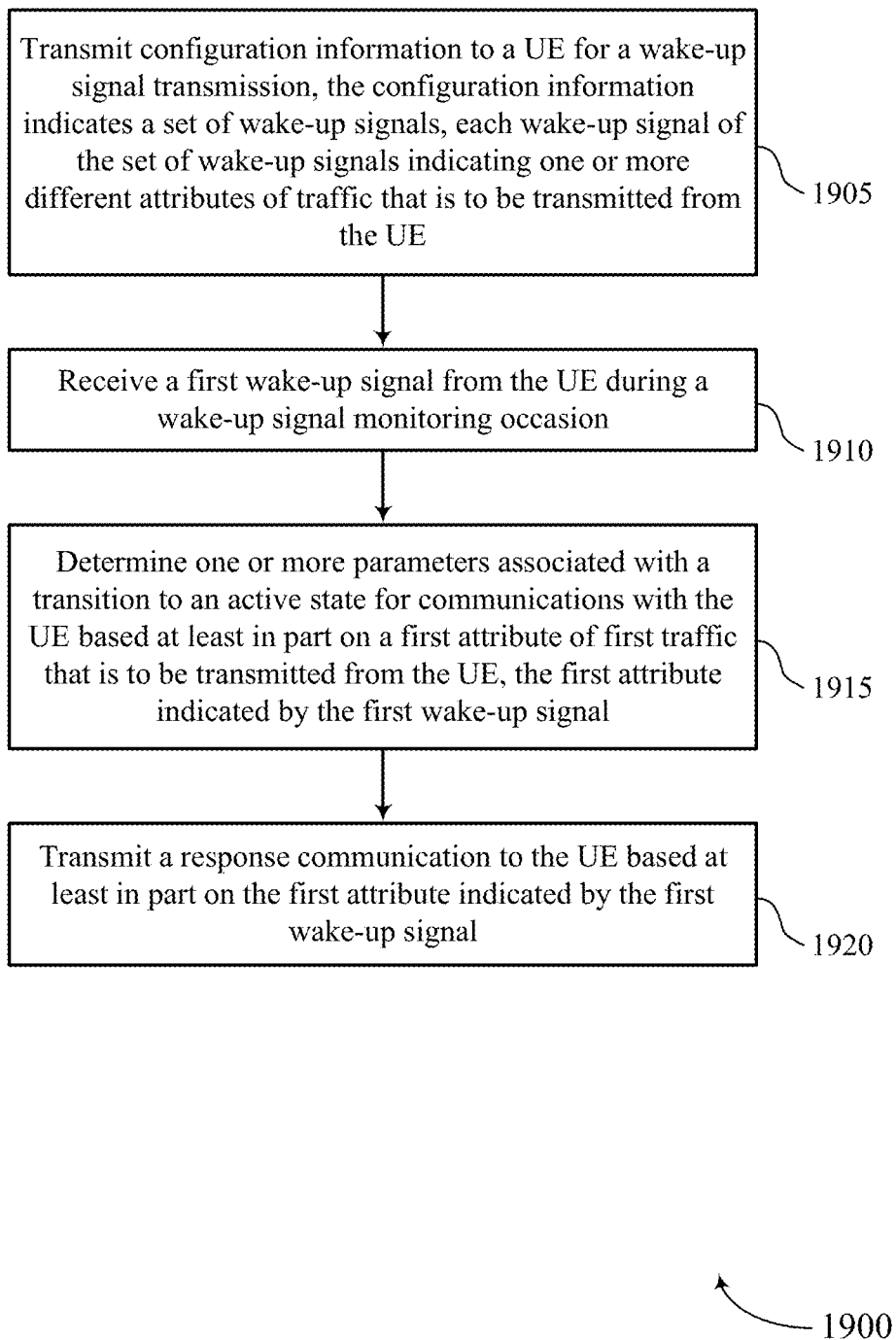

FIG. 19 shows a flowchart illustrating a method 1900 that supports wake-up signal traffic indication techniques for wireless communications in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting configuration information to a UE for a wake-up signal transmission, the configuration information indicates a set of wake-up signals, each wake-up signal of the set of wake-up signals indicating one or more different attributes of traffic that is to be transmitted from the UE. The operations of 1905 may be performed in accordance with examples as disclosed herein. In some examples, aspects of the operations of 1905 may be performed by a configuration manager 1225 as described with reference to FIG. 12.

At 1910, the method may include receiving a first wake-up signal from the UE during a wake-up signal monitoring occasion. The operations of 1910 may be performed in accordance with examples as disclosed herein. In some examples, aspects of the operations of 1910 may be performed by a WUS monitoring manager 1230 as described with reference to FIG. 12.

At 1915, the method may include determining one or more parameters associated with a transition to an active state for communications with the UE based on a first attribute of first traffic that is to be transmitted from the UE, the first attribute indicated by the first wake-up signal. The operations of 1915 may be performed in accordance with examples as disclosed herein. In some examples, aspects of the operations of 1915 may be performed by an active state manager 1235 as described with reference to FIG. 12.

At 1920, the method may include transmitting a response communication to the UE based on the first attribute indicated by the first wake-up signal. The operations of 1920 may be performed in accordance with examples as disclosed herein. In some examples, aspects of the operations of 1920 may be performed by a WUS response manager 1255 as described with reference to FIG. 12.

The following provides an overview of aspects of the present disclosure:

Aspect 1: A method for wireless communication at a UE, comprising: receiving configuration information for a wake-up signal transmission, the configuration information indicates a set of wake-up signals, each wake-up signal of the set of wake-up signals indicating one or more different attributes of traffic that is to be transmitted from the UE; selecting a first wake-up signal from the set of wake-up signals based at least in part on a first attribute of first traffic that is to be transmitted from the UE; and transmitting the first wake-up signal during a wake-up signal occasion to indicate to a cell that the cell is requested to be in an active state for a time period outside of the wake-up signal occasion based at least in part on the first attribute indication of the first wake-up signal.

Aspect 2: The method of aspect 1, wherein the first wake-up signal is a random access request transmitted via a RACH, or is request that is transmitted via a control channel.

Aspect 3: The method of any of aspects 1 through 2, wherein the selecting the first wake-up signal comprises: selecting the first wake-up signal from the set of wake-up signals based at least in part on a transmit buffer status of the UE, a power headroom available at the UE, a priority of the first traffic, a latency target of the first traffic, or any combinations thereof.

Aspect 4: The method of any of aspects 1 through 3, wherein the selecting the first wake-up signal further comprises: selecting the first wake-up signal from the set of wake-up signals based at least in part on a time duration that the cell is requested to be in the active state.

Aspect 5: The method of any of aspects 1 through 4, wherein the set of wake-up signals includes a set of random access preambles, and one or more of the random access preambles are mapped to the one or more different attributes of traffic that is to be transmitted from the UE.

Aspect 6: The method of aspect 5, wherein the set of random access preambles includes two or more different subsets of random access preambles, and wherein each of the two or more different subsets of random access preambles are mapped to the one or more different attributes of traffic that is to be transmitted from the UE.

Aspect 7: The method of aspect 6, wherein the configuration information is received via RRC signaling.

Aspect 8: The method of aspect 7, wherein the RRC signaling maps each subset of the two or more different subsets of random access preambles to a different combination of two or more attributes of traffic that is to be transmitted from the UE.

Aspect 9: The method of any of aspects 1 through 8, wherein the transmitting the first wake-up signal comprises: transmitting an uplink control channel transmission that includes a payload that indicates the one or more different attributes of traffic that is to be transmitted from the UE.

Aspect 10: The method of aspect 9, wherein the payload comprises an index value of a set of index values, wherein each index value of the set of index values is mapped to a different combination of two or more attributes of traffic that is to be transmitted from the UE.

Aspect 11: The method of any of aspects 1 through 10, further comprising: monitoring for a response communication from the cell based at least in part on the first attribute indication of the first wake-up signal.

Aspect 12: The method of aspect 11, wherein the monitoring comprises: monitoring for a downlink control channel communication in a time window that is based at least in part on a latency associated with the first attribute indication of the first wake-up signal.

Aspect 13: A method for wireless communication at a network entity, comprising: transmitting configuration information to a UE for a wake-up signal transmission, the configuration information indicates a set of wake-up signals, each wake-up signal of the set of wake-up signals indicating one or more different attributes of traffic that is to be transmitted from the UE; receiving a first wake-up signal from the UE during a wake-up signal monitoring occasion; and determining one or more parameters associated with a transition to an active state for communications with the UE based at least in part on a first attribute of first traffic that is to be transmitted from the UE, the first attribute indicated by the first wake-up signal.

Aspect 14: The method of aspect 13, wherein the first wake-up signal is a random access request transmitted via a RACH, or is request that is transmitted via a control channel.

Aspect 15: The method of any of aspects 13 through 14, wherein the one or more different attributes of traffic that is to be transmitted from the UE include one or more of a transmit buffer status of the UE, a power headroom available at the UE, a priority of the first traffic, a latency target of the first traffic, or any combinations thereof.

Aspect 16: The method of any of aspects 13 through 15, wherein the first wake-up signal further indicates a time duration requested for the active state for communications with the UE.

Aspect 17: The method of any of aspects 13 through 16, wherein the set of wake-up signals includes a set of random access preambles, and one or more of the random access preambles are mapped to the one or more different attributes of traffic that is to be transmitted from the UE.

Aspect 18: The method of aspect 17, wherein the set of random access preambles includes two or more different subsets of random access preambles, and wherein each of the two or more different subsets of random access preambles are mapped to the one or more different attributes of traffic that is to be transmitted from the UE.

Aspect 19: The method of aspect 18, wherein the configuration information is transmitted via RRC signaling.

Aspect 20: The method of aspect 19, wherein the RRC signaling maps each subset of the two or more different subsets of random access preambles to a different combination of two or more attributes of traffic that is to be transmitted from the UE.

Aspect 21: The method of any of aspects 13 through 20, wherein the receiving the first wake-up signal comprises: receiving an uplink control channel transmission that includes a payload that indicates the one or more different attributes of traffic that is to be transmitted from the UE.

Aspect 22: The method of aspect 21, wherein the payload comprises an index value of a set of index values, wherein each index value of the set of index values is mapped to a different combination of two or more attributes of traffic that is to be transmitted from the UE.

Aspect 23: The method of any of aspects 13 through 22, further comprising: transmitting a response communication to the UE based at least in part on the first attribute indicated by the first wake-up signal.

Aspect 24: The method of aspect 23, wherein a timing for transmission of the response communication is based at least in part on a latency associated with the first attribute indicated by the first wake-up signal.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a network entity, comprising a processor; memory coupled with the processor; and instructions stored in the memory and executable by the processor to cause the apparatus to perform a method of any of aspects 13 through 24.

Aspect 29: An apparatus for wireless communication at a network entity, comprising at least one means for performing a method of any of aspects 13 through 24.

Aspect 30: A non-transitory computer-readable medium storing code for wireless communication at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving configuration information for a wake-up signal transmission, the configuration information indicates a set of wake-up signals, each wake-up signal of the set of wake-up signals indicating one or more different attributes of traffic that is to be transmitted from the UE;
   selecting a first wake-up signal from the set of wake-up signals based at least in part on a first attribute of first traffic that is to be transmitted from the UE; and
   transmitting the first wake-up signal during a wake-up signal occasion to indicate to a cell that the cell is requested to be in an active state for a time period outside of the wake-up signal occasion based at least in part on the first attribute indication of the first wake-up signal.

2. The method of claim 1, wherein the first wake-up signal is a random access request transmitted via a random access channel (RACH), or is request that is transmitted via a control channel.

3. The method of claim 1, wherein the selecting the first wake-up signal comprises:
   selecting the first wake-up signal from the set of wake-up signals based at least in part on a transmit buffer status of the UE, a power headroom available at the UE, a priority of the first traffic, a latency target of the first traffic, or any combinations thereof.

4. The method of claim 1, wherein the selecting the first wake-up signal further comprises:
   selecting the first wake-up signal from the set of wake-up signals based at least in part on a time duration that the cell is requested to be in the active state.

5. The method of claim 1, wherein the set of wake-up signals includes a set of random access preambles, and one or more of the random access preambles are mapped to the one or more different attributes of traffic that is to be transmitted from the UE.

6. The method of claim 5, wherein the set of random access preambles includes two or more different subsets of random access preambles, and wherein each of the two or more different subsets of random access preambles are mapped to the one or more different attributes of traffic that is to be transmitted from the UE.

7. The method of claim 6, wherein the configuration information is received via radio resource control (RRC) signaling.

8. The method of claim 7, wherein the RRC signaling maps each subset of the two or more different subsets of random access preambles to a different combination of two or more attributes of traffic that is to be transmitted from the UE.

9. The method of claim 1, wherein the transmitting the first wake-up signal comprises:
   transmitting an uplink control channel transmission that includes a payload that indicates the one or more different attributes of traffic that is to be transmitted from the UE.

10. The method of claim 9, wherein the payload comprises an index value of a set of index values, wherein each index value of the set of index values is mapped to a different combination of two or more attributes of traffic that is to be transmitted from the UE.

11. The method of claim 1, further comprising:
    monitoring for a response communication from the cell based at least in part on the first attribute indication of the first wake-up signal.

12. The method of claim 11, wherein the monitoring comprises:
    monitoring for a downlink control channel communication in a time window that is based at least in part on a latency associated with the first attribute indication of the first wake-up signal.

13. A method for wireless communication at a network entity, comprising:
    transmitting configuration information to a user equipment (UE) for a wake-up signal transmission, the configuration information indicates a set of wake-up signals, each wake-up signal of the set of wake-up signals indicating one or more different attributes of traffic that is to be transmitted from the UE;
    receiving a first wake-up signal from the UE during a wake-up signal monitoring occasion; and
    determining one or more parameters associated with a transition to an active state for communications with the UE based at least in part on a first attribute of first traffic that is to be transmitted from the UE, the first attribute indicated by the first wake-up signal.

14. The method of claim 13, wherein the first wake-up signal is a random access request transmitted via a random access channel (RACH), or is request that is transmitted via a control channel.

15. The method of claim 13, wherein the one or more different attributes of traffic that is to be transmitted from the UE include one or more of a transmit buffer status of the UE, a power headroom available at the UE, a priority of the first traffic, a latency target of the first traffic, or any combinations thereof.

16. The method of claim 13, wherein the first wake-up signal further indicates a time duration requested for the active state for communications with the UE.

17. The method of claim 13, wherein the set of wake-up signals includes a set of random access preambles, and one or more of the random access preambles are mapped to the one or more different attributes of traffic that is to be transmitted from the UE.

18. The method of claim 17, wherein the set of random access preambles includes two or more different subsets of random access preambles, and wherein each of the two or more different subsets of random access preambles are mapped to the one or more different attributes of traffic that is to be transmitted from the UE.

19. The method of claim 18, wherein the configuration information is transmitted via radio resource control (RRC) signaling.

20. The method of claim 19, wherein the RRC signaling maps each subset of the two or more different subsets of random access preambles to a different combination of two or more attributes of traffic that is to be transmitted from the UE.

21. The method of claim 13, wherein the receiving the first wake-up signal comprises:
receiving an uplink control channel transmission that includes a payload that indicates the one or more different attributes of traffic that is to be transmitted from the UE.

22. The method of claim 21, wherein the payload comprises an index value of a set of index values, wherein each index value of the set of index values is mapped to a different combination of two or more attributes of traffic that is to be transmitted from the UE.

23. The method of claim 13, further comprising:
transmitting a response communication to the UE based at least in part on the first attribute indicated by the first wake-up signal.

24. The method of claim 23, wherein a timing for transmission of the response communication is based at least in part on a latency associated with the first attribute indicated by the first wake-up signal.

25. An apparatus for wireless communication at a user equipment (UE), comprising:
a processor;
memory coupled with the processor; and
instructions stored in the memory and executable by the processor to cause the apparatus to:
receive configuration information for a wake-up signal transmission, the configuration information indicates a set of wake-up signals, each wake-up signal of the set of wake-up signals indicating one or more different attributes of traffic that is to be transmitted from the UE;
select a first wake-up signal from the set of wake-up signals based at least in part on a first attribute of first traffic that is to be transmitted from the UE; and
transmit the first wake-up signal during a wake-up signal occasion to indicate to a cell that the cell is requested to be in an active state for a time period outside of the wake-up signal occasion based at least in part on the first attribute indicated by the first wake-up signal.

26. The apparatus of claim 25, wherein the set of wake-up signals includes a set of random access preambles, and one or more of the random access preambles are mapped to the one or more different attributes of traffic that is to be transmitted from the UE.

27. The apparatus of claim 25, wherein the instructions to transmit the first wake-up signal are executable by the processor to cause the apparatus to:
transmit an uplink control channel transmission that includes a payload that indicates the one or more different attributes of traffic that is to be transmitted from the UE.

28. An apparatus for wireless communication at a network entity, comprising:
a processor;
memory coupled with the processor; and
instructions stored in the memory and executable by the processor to cause the apparatus to:
transmit configuration information to a user equipment (UE) for a wake-up signal transmission, the configuration information indicates a set of wake-up signals, each wake-up signal of the set of wake-up signals indicating one or more different attributes of traffic that is to be transmitted from the UE;
receive a first wake-up signal from the UE during a wake-up signal monitoring occasion; and
determine one or more parameters associated with a transition to an active state for communications with the UE based at least in part on a first attribute of first traffic that is to be transmitted from the UE, the first attribute indicated by the first wake-up signal.

29. The apparatus of claim 28, wherein the set of wake-up signals includes a set of random access preambles, and one or more of the random access preambles are mapped to the one or more different attributes of traffic that is to be transmitted from the UE.

30. The apparatus of claim 28, wherein the instructions to receive the first wake-up signal are executable by the processor to cause the apparatus to:
receive an uplink control channel transmission that includes a payload that indicates the one or more different attributes of traffic that is to be transmitted from the UE.

* * * * *